(12) United States Patent
Yang et al.

(10) Patent No.: US 12,052,357 B2
(45) Date of Patent: Jul. 30, 2024

(54) SMART LOCK UNLOCKING METHOD AND RELATED DEVICE

(71) Applicant: HUAWEI TECHNOLOGIES CO., LTD., Guangdong (CN)

(72) Inventors: Yanjiang Yang, Singapore (SG); Zhuo Wei, Singapore (SG); Wei Wang, Singapore (SG); Xutao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 17/553,957

(22) Filed: Dec. 17, 2021

(65) Prior Publication Data
US 2022/0109561 A1 Apr. 7, 2022

Related U.S. Application Data

(63) Continuation of application No. PCT/CN2020/097294, filed on Jun. 20, 2020.

(30) Foreign Application Priority Data

Jun. 20, 2019 (CN) .......................... 201910536630.3

(51) Int. Cl.
*H04L 9/08* (2006.01)
*B60R 25/24* (2013.01)
(Continued)

(52) U.S. Cl.
CPC .............. *H04L 9/088* (2013.01); *B60R 25/24* (2013.01); *B60R 25/33* (2013.01); *H04L 9/32* (2013.01); *B60R 2325/101* (2013.01)

(58) Field of Classification Search
CPC ......... H04L 9/088; H04L 9/32; H04L 9/3215; H04L 2209/805; H04L 9/3271;
(Continued)

(56) References Cited

U.S. PATENT DOCUMENTS 8,126,450 B2 * 2/2012 Howarter .............. B60R 25/241
455/420
8,947,202 B2 2/2015 Tucker et al.
(Continued)

FOREIGN PATENT DOCUMENTS

CN 1813271 A 8/2006
CN 104484923 A 4/2015
(Continued)

OTHER PUBLICATIONS

Office Action issued in CN201910536630.3, dated Jun. 22, 2022, 15 pages.
(Continued)

*Primary Examiner* — J. Brant Murphy

(57) ABSTRACT

A method and a related device for unlocking a smart lock are provided, and may be applied to an intelligent vehicle or a self-driving vehicle, to implement an unlocking function of a smart lock of the vehicle. The method includes: A terminal device monitors a distance change trend between the terminal device and an intelligent device, where the intelligent device includes a smart lock. If the terminal device determines that the terminal device is approaching the intelligent device and a distance between the terminal device and the intelligent device is less than a first distance threshold, the terminal device enables an identity authentication process between the terminal device and the intelligent device. The terminal device unlocks the smart lock when identity authentication between the terminal device and the intelligent device succeeds.

16 Claims, 8 Drawing Sheets

(51) Int. Cl.
*B60R 25/33* (2013.01)
*H04L 9/32* (2006.01)

(58) Field of Classification Search
CPC ... B60R 25/24; B60R 25/33; B60R 2325/101; B60R 2325/205; H04W 12/069; H04W 4/40; H04W 12/062; H04W 84/18; H04W 12/63; H04W 12/65; H04W 12/08; G07C 2009/00404; G07C 2009/00555; G07C 2209/63; G07C 9/28; G07C 9/00309
See application file for complete search history.

(56) References Cited

U.S. PATENT DOCUMENTS

| | | | |
|---|---|---|---|
| 2007/0132552 A1* | 6/2007 | Kurpinski | B60R 25/2036 340/5.72 |
| 2010/0075656 A1* | 3/2010 | Howarter | B60R 25/241 340/5.2 |
| 2016/0086400 A1 | 3/2016 | Dumas et al. | |
| 2016/0125675 A1 | 5/2016 | Ziller | |
| 2017/0048680 A1 | 2/2017 | Chuang | |
| 2018/0190049 A1 | 7/2018 | Schmidt-Lackner et al. | |
| 2019/0026966 A1* | 1/2019 | Varelius | H04L 12/12 |
| 2019/0182672 A1* | 6/2019 | Kuenzi | H04W 12/084 |
| 2019/0293439 A1* | 9/2019 | Hiruta | G01C 21/3438 |

FOREIGN PATENT DOCUMENTS

| | | |
|---|---|---|
| CN | 105339989 A | 2/2016 |
| CN | 105490996 A | 4/2016 |
| CN | 205277054 U | 6/2016 |
| CN | 106204817 A | 12/2016 |
| CN | 106740679 A | 5/2017 |
| CN | 106934884 A | 7/2017 |
| CN | 107121664 A | 9/2017 |
| CN | 107730678 A | 2/2018 |
| CN | 107734460 A | 2/2018 |
| CN | 108133523 A | 6/2018 |
| CN | 109345668 A | 2/2019 |
| EP | 3147868 A1 | 3/2017 |
| EP | 3313105 A1 | 4/2018 |
| WO | 2007128319 A2 | 11/2007 |
| WO | 2018127407 A1 | 7/2018 |
| WO | 2019089376 A1 | 5/2019 |

OTHER PUBLICATIONS

Feng Liping et al., "Qiche Anquan Jiashi Jishu", Nov. 30, 2013, total: 5 pages.
Office Action issued in CN201910536630.3, dated Sep. 16, 2022, 15 pages.
Extended European Search Report issued in EP20827245.0, dated Jul. 8, 2022, 9 pages.
Aurélien Francillon et al, Relay Attacks on Passive Keyless Entry and Start Systems in Modern Cars, 2010, 15 pages.
Office Action issued in CN201910536630.3, dated Apr. 28, 2021, 15 pages.
Office Action issued in CN201910536630.3, dated Oct. 8, 2021, 14 pages.
International Search Report and Written Opinion issued in PCT/CN2020/097294, dated Sep. 27, 2020, 10 pages.

* cited by examiner

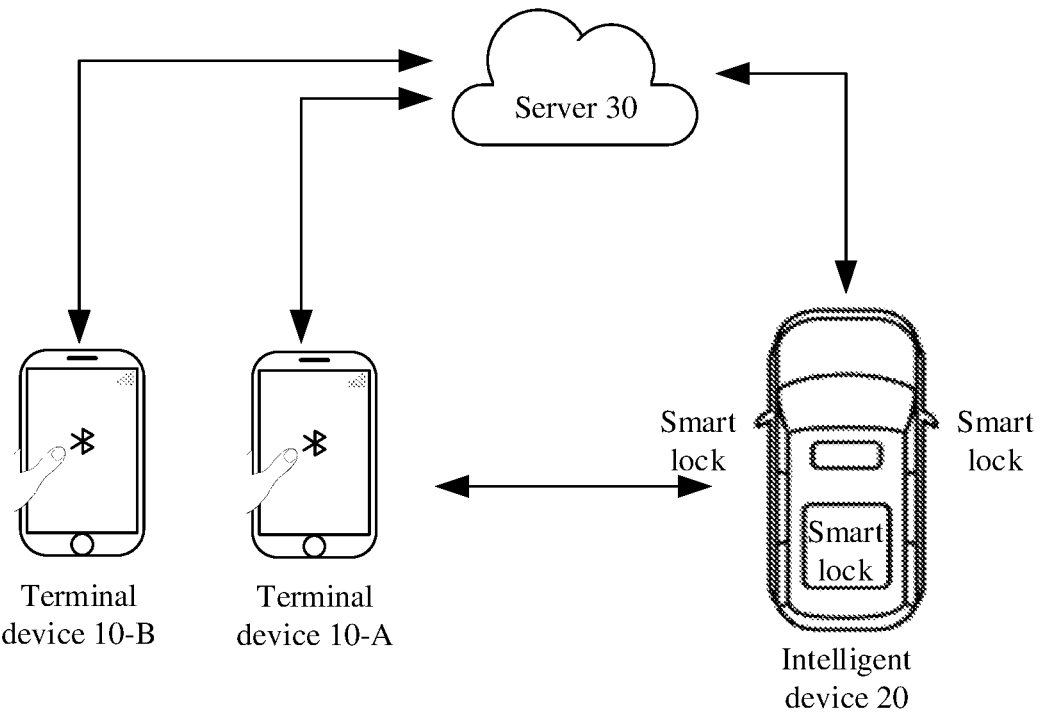

FIG. 3

```
┌─────────────────────────────────────────────────────────────┐
│ A terminal device monitors a distance change trend between  │
│ the terminal device and an intelligent device, where the    │── S401
│ intelligent device includes a smart lock                    │
└─────────────────────────────────────────────────────────────┘
                             │
                             ▼
┌─────────────────────────────────────────────────────────────┐
│ If the terminal device determines that the terminal device  │
│ is approaching the intelligent device and a distance between│
│ the terminal device and the intelligent device is less than │── S402
│ a first distance threshold, enable an identity              │
│ authentication process between the terminal device and the  │
│ intelligent device                                          │
└─────────────────────────────────────────────────────────────┘
                             │
                             ▼
┌─────────────────────────────────────────────────────────────┐
│ The terminal device unlocks the smart lock when identity    │── S403
│ authentication between the terminal device and the          │
│ intelligent device succeeds                                 │
└─────────────────────────────────────────────────────────────┘
```

FIG. 4

SMART LOCK UNLOCKING METHOD AND RELATED DEVICE

CROSS-REFERENCE TO RELATED APPLICATIONS

This application is continuation of International Application No. PCT/CN2020/097294, filed on Jun. 20, 2020, which claims priority to Chinese Patent Application No. 201910536630.3, filed on Jun. 20, 2019. The disclosures of the aforementioned applications are hereby incorporated by reference in their entireties.

TECHNICAL FIELD

The present disclosure relates to the field of smart unlocking technologies, and in particular, to a smart lock unlocking method and a related device.

BACKGROUND

With development of science and technology, unlocking is no longer performed only by using a physical key or an electronic key card, and manners such as password unlocking, fingerprint recognition unlocking, and facial recognition unlocking are increasingly used. Compared with a conventional unlocking manner, these smart unlocking manners avoid carrying a key (a physical key or an electronic key card) and are convenient and fast, and therefore are widely used.

However, in some scenarios, the foregoing smart unlocking manners still cannot well meet a user requirement. For example, when a user needs to remotely perform unlocking without arriving at an unlocking site, or when a user arrives at an unlocking site but it is inconvenient for the user to perform unlocking (for example, it is inconvenient for the user to enter a password when the user carries heavy objects in both hands, a finger is injured, or a facial recognition rate is low), unlocking cannot be effectively performed in the foregoing manners. However, the advent of a digital key resolves the foregoing problems. The digital key means using a near field communication technology (for example, Bluetooth or near field communication (NFC)) to enable a user to perform operations such as unlocking or locking a smart lock by using a smartphone or a wearable intelligent device (for example, a smart watch). Digital keys are widely used in scenarios such as a vehicle, a company door status control device, a home door lock, a safe, and bicycle sharing.

For example, in the vehicle field, using portable terminal devices such as smartphones or smart bands as digital vehicle keys is widely recognized in the industry, and becomes a future trend. Because a mobile phone and a band have become daily necessities, a vehicle owner does not need to carry an additional device (for example, a physical key or an electronic key card) for unlocking or perform cumbersome steps of using a fingerprint, a face, a password, or the like, but only needs to fall within a range of distances from a vehicle to implement automatic unlocking or locking of a vehicle door lock by using a near field communication function (which is usually Bluetooth or NFC) of the mobile phone or the band, so that great convenience is brought to the user. FIG. 1 is a schematic diagram of performing unlocking by using a digital vehicle key in the conventional technology. When a digital vehicle key (for example, a mobile phone) carried by an authorized user (for example, a vehicle owner) is sufficiently close to a smart lock (for example, a vehicle door lock) (within a communication range of a corresponding near field communication manner, where a Bluetooth communication manner is used as an example in FIG. 1), the vehicle door lock sends an identity authentication challenge to the mobile phone that initiates an unlocking request. If an identity authentication response of the mobile phone passes detection of the vehicle door lock, the vehicle door lock is automatically unlocked. However, in some scenarios, a relay attacker may use a repeater to amplify a signal, causing a communication connection to be established between a mobile phone and a vehicle door lock that are far away from each other. Consequently, both parties mistakenly consider that both parties are close to each other, and the vehicle door lock is unlocked without authorization. For example, when a mobile phone of a user is stationary and is relatively far away from a vehicle door lock, or when a user walks with a mobile phone in hand and is relatively far away from a vehicle door lock, the foregoing relay attack may occur, causing losses such as a loss of property.

Therefore, how to avoid a relay attack while ensuring security of use of a digital key in a process of conveniently performing unlocking by using the digital key is a problem that urgently needs to be resolved.

SUMMARY

A technical problem to be resolved in embodiments of the present invention is to provide a smart lock unlocking method and a related device, to resolve a relay attack problem in a smart unlocking process.

According to a first aspect, an embodiment of the present invention provides a smart lock unlocking method. The method may include: A terminal device monitors a distance change trend between the terminal device and an intelligent device, where the intelligent device includes a smart lock. If the terminal device determines that the terminal device is approaching the intelligent device and a distance between the terminal device and the intelligent device is less than a first distance threshold, the terminal device enables an identity authentication process between the terminal device and the intelligent device. The terminal device unlocks the smart lock when identity authentication between the terminal device and the intelligent device succeeds. In this embodiment, the terminal device monitors the distance change trend between the terminal device and the intelligent device in which the smart lock is located, enables the identity authentication process between the terminal device and the intelligent device only when the terminal device determines that the terminal device is approaching the intelligent device and the distance is less than a specific threshold, and unlocks the smart lock after identity authentication succeeds. Before enabling the identity authentication process, the terminal device not only considers the distance between the terminal device and the intelligent device, but also monitors the distance change trend between the terminal device and the intelligent device to determine whether the terminal device is approaching the intelligent device, in other words, fully determines whether a user holding the terminal device has an unlocking intention (for example, whether the user holding the terminal device is walking and approaching the intelligent device), to avoid enabling the identity authentication process only by determining the distance (within a communication range of a near field communication manner), so that a potential risk that an attacker can perform unlocking without authorization only by using a relay attack to forge an illusion of a short distance is avoided, thereby greatly improving unlocking security of a digital key.

In a possible implementation, the method further includes: When the distance between the terminal device and the intelligent device is less than a second distance threshold, the terminal device establishes a communication connection to the intelligent device through Bluetooth, and triggers the distance change trend between the terminal device and the intelligent device to be monitored, where the second distance threshold is greater than the first distance threshold. In this embodiment, the terminal device communicates with the intelligent device through Bluetooth, and a Bluetooth communication range usually ranges from dozens to hundreds of meters. If the terminal device starts to monitor the distance change trend when the terminal device and the intelligent device fall within a relatively large Bluetooth communication range, monitoring power consumption of the terminal device may be relatively high. In addition, when the distance is relatively long, it is usually unable to more effectively determine whether the user holding the terminal device has an unlocking intention. Therefore, in this embodiment, without affecting unlocking condition determining, when the distance between the terminal device and the intelligent device is relatively short, a Bluetooth pairing connection is performed, and monitoring of the distance change trend is triggered, so that power consumption of the terminal device is reduced, and the accuracy of determining unlocking condition is improved.

In a possible implementation, the method further includes: locking the smart lock if the terminal device determines that the terminal device is being away from the intelligent device and the distance between the terminal device and the intelligent device is greater than a third distance threshold. In this embodiment, the terminal device further determines, by monitoring the distance change trend between the terminal device and the intelligent device, whether the terminal device is being away from the intelligent device, in other words, fully determines whether the user holding the terminal device has an intention of locking the smart lock, to prevent the user from performing a manual operation. For example, when it is determined that the terminal device is being away from a company door status control device, a home door lock, a vehicle door, a safe, a shared bicycle, or the like and a distance exceeds a specific threshold, a corresponding smart lock is automatically locked without a manual operation or perception of the user. This is convenient and fast, and achieves good user experience.

In a possible implementation, that the terminal device monitors a distance change trend between the terminal device and an intelligent device includes: The terminal device determines a distance change between the terminal device and the intelligent device based on first distance information between the terminal device and the intelligent device, where the first distance information includes one or more of Bluetooth signal strength change information, global positioning system (GPS) ranging information, or impulse radio ultra-wideband (IR-UWB) ranging information. In this embodiment, the terminal device may specifically monitor the distance change trend between the terminal device and the intelligent device by using one or more of the Bluetooth signal strength information, the GPS ranging information, or the IR-UWB ranging information, to determine the distance between the terminal device and the intelligent device and determine whether the terminal device is approaching or being away from the intelligent device.

In a possible implementation, before the enabling of an identity authentication process between the terminal device and the intelligent device, the method further includes: The terminal device compares an environment parameter of the terminal device and a corresponding environment parameter of the intelligent device, where the environment parameter includes one or more of temperature, humidity, light intensity, smell, or noise. The terminal device determines, based on a comparison result, whether the terminal device and the intelligent device are located in a same environment. If yes, the terminal device allows the identity authentication process between the terminal device and the intelligent device to be enabled. In this embodiment, before determining whether to enable the identity authentication process, the terminal device not only considers whether the terminal device is approaching the intelligent device and is relatively close to the intelligent device, but also determines, by using the environment parameters, whether the terminal device and the intelligent device are located in a same environment, to further accurately determine whether the terminal device held by the user is truly near the intelligent device (in other words, whether it is true that the user probably needs to unlock the smart lock) instead of being quite close as forged by an attacker, thereby more effectively avoiding unauthorized unlocking caused by a relay attack, ensuring security of the smart lock, and improving user experience.

In a possible implementation, before the enabling of an identity authentication process between the terminal device and the intelligent device, the method further includes: The terminal device initiates a sound response indication to the intelligent device. The terminal device receives a feedback sound sent by the intelligent device based on the sound response indication. If it is determined that a sound response is successfully matched, the terminal device allows the identity authentication process between the terminal device and the intelligent device to be enabled. In this embodiment, before determining whether to enable the identity authentication process, the terminal device not only considers whether the terminal device is approaching the intelligent device and is relatively close to the intelligent device, but also determines, by using the sound response, whether the terminal device and the intelligent device fall within a relatively small distance range, to further accurately determine whether the terminal device held by the user is truly near the intelligent device (in other words, whether it is true that the user probably needs to unlock the smart lock) instead of being quite close as forged by an attacker, thereby more effectively avoiding unauthorized unlocking caused by a relay attack, ensuring security of the smart lock, and improving user experience.

In a possible implementation, the identity authentication process between the terminal device and the intelligent device includes: The terminal device and the intelligent device perform a security authentication process based on a pre-authenticated shared key or a public-private key pair. In this embodiment, in the identity authentication process between the terminal device and the intelligent device, an identity authentication challenge/response procedure is performed by using a shared key (for example, a symmetric key) pre-negotiated between the terminal device and the intelligent device or a public-private key pair (for example, an asymmetric key), so that the intelligent device can determine whether the terminal device is authorized, thereby implementing a subsequent secure smart unlocking service.

In a possible implementation, the intelligent device includes a plurality of smart locks; and the unlocking the smart lock includes: The terminal device determines a closest target smart lock in the plurality of smart locks, and unlocks the target smart lock. In this embodiment, when the intelligent device includes a plurality of smart locks, the terminal device may further determine a smart lock closer to the terminal device, and correspondingly unlock the smart lock, to provide a more personalized smart unlocking service for the user, thereby further improving user experience.

In a possible implementation, that the terminal device is approaching the intelligent device includes at least one of the following: Bluetooth signal strength between the terminal device and the intelligent device is becoming stronger; a GPS distance between the terminal device and the intelligent device is becoming shorter; or an IR-UWB distance between the terminal device and the intelligent device is becoming shorter. In this embodiment, the terminal device may specifically monitor the distance change trend between the terminal device and the intelligent device by using one or more of the Bluetooth signal strength information, the GPS ranging information, or the IR-UWB ranging information, to determine the distance between the terminal device and the intelligent device and determine whether the terminal device is approaching the intelligent device.

In a possible implementation, that the terminal device is being away from the intelligent device includes at least one of the following: Bluetooth signal strength between the terminal device and the intelligent device is becoming weaker; a GPS distance between the terminal device and the intelligent device is becoming longer; or an IR-UWB distance between the terminal device and the intelligent device is becoming longer. In this embodiment, the terminal device may specifically monitor the distance change trend between the terminal device and the intelligent device by using one or more of the Bluetooth signal strength information, the GPS ranging information, or the IR-UWB ranging information, to determine the distance between the terminal device and the intelligent device and determine whether the terminal device is being away from the intelligent device.

According to a second aspect, an embodiment of the present invention provides a smart lock unlocking method. The method may include: An intelligent device monitors a distance change trend between the intelligent device and a terminal device, where the intelligent device includes a smart lock. If the intelligent device determines that the terminal device is approaching the intelligent device and a distance between the intelligent device and the terminal device is less than a first distance threshold, the intelligent device enables an identity authentication process between the intelligent device and the terminal device. The intelligent device unlocks the smart lock when identity authentication between the intelligent device and the terminal device succeeds. In this embodiment, the intelligent device in which the smart lock is located monitors the distance change trend between the intelligent device and the terminal device, enables the identity authentication process between the intelligent device and the terminal device only when the intelligent device determines that the terminal device is approaching the intelligent device and the distance is less than a specific threshold, and unlocks the smart lock after identity authentication succeeds. Before enabling the identity authentication process, the intelligent device not only considers the distance between the intelligent device and the terminal device, but also monitors the distance change trend between the intelligent device and the terminal device to determine whether the terminal device is approaching the intelligent device, in other words, fully determines whether a user holding the terminal device has an unlocking intention, to avoid enabling the identity authentication process only by determining the distance (within a communication range of a near field communication manner), so that a potential risk that an attacker can perform unlocking without authorization only by using a relay attack to forge an illusion of a short distance is avoided, thereby greatly improving unlocking security of a digital key.

In a possible implementation, the method further includes: When the distance between the intelligent device and the terminal device is less than a second distance threshold, the intelligent device establishes a communication connection to the terminal device through Bluetooth, and triggers the distance change trend between the intelligent device and the terminal device to be monitored, where the second distance threshold is greater than the first distance threshold. In this embodiment, the terminal device communicates with the intelligent device through Bluetooth, and a Bluetooth communication range usually ranges from dozens to hundreds of meters. If the intelligent device starts to monitor the distance change trend when the terminal device and the intelligent device fall within a relatively large Bluetooth communication range, monitoring power consumption of the intelligent device may be relatively high. In addition, when the distance is relatively long, it is usually unable to more effectively determine whether the user holding the terminal device has an unlocking intention. Therefore, in this embodiment, without affecting unlocking condition determining, when the distance between the terminal device and the intelligent device is relatively short, a Bluetooth pairing connection is performed, and monitoring of the distance change trend is triggered, so that power consumption of the intelligent device is reduced, and the accuracy of determining unlocking condition is improved.

In a possible implementation, the method further includes: The intelligent device locks the smart lock if the intelligent device determines that the intelligent device is being away from the terminal device and the distance between the intelligent device and the terminal device is greater than the second distance threshold. In this embodiment, the intelligent device further determines, by monitoring the distance change trend between the intelligent device and the terminal device, whether the intelligent device is being away from the terminal device, in other words, fully determines whether the user holding the terminal device has an intention of locking the smart lock, to prevent the user from performing a manual operation. For example, when it is determined that the terminal device is being away from a company door status control device, a home door lock, a vehicle door, a safe, a shared bicycle, or the like and a distance exceeds a specific threshold, a corresponding smart lock is automatically locked without a manual operation or perception of the user. This is convenient and fast, and achieves good user experience.

In a possible implementation, that the intelligent device monitors a distance change trend between the intelligent device and a terminal device includes: The intelligent device determines a distance change between the intelligent device and the terminal device based on first distance information between the intelligent device and the terminal device, where the first distance information includes one or more of Bluetooth signal strength change information, global positioning system (GPS) ranging information, or impulse radio ultra-wideband (IR-UWB) ranging information. In this embodiment, the intelligent device may specifically monitor the distance change trend between the intelligent device and the terminal device by using one or more of the Bluetooth signal strength information, the GPS ranging information, or the IR-UWB ranging information, to determine the distance between the intelligent device and the terminal device and determine whether the terminal device is approaching or being away from the intelligent device.

In a possible implementation, before the enabling of an identity authentication process between the intelligent device and the terminal device, the method further includes: The intelligent device compares an environment parameter of the intelligent device and a corresponding environment parameter of the terminal device, where the environment parameter includes one or more of temperature, humidity, light intensity, smell, or noise. The intelligent device determines, based on a comparison result, whether the terminal device and the intelligent device are located in a same environment. If yes, the intelligent device allows the identity authentication process between the intelligent device and the terminal device to be enabled. In this embodiment, before determining whether to enable the identity authentication process, the intelligent device not only considers whether the terminal device is approaching the intelligent device and is relatively close to the intelligent device, but also determines, by using the environment parameters, whether the terminal device and the intelligent device are located in a same environment, to further accurately determine whether the terminal device held by the user is truly near the intelligent device (in other words, whether it is true that the user probably needs to unlock the smart lock) instead of being quite close as forged by an attacker, thereby more effectively avoiding unauthorized unlocking caused by a relay attack, ensuring security of the smart lock, and improving user experience.

In a possible implementation, before the enabling of an identity authentication process between the intelligent device and the terminal device, the method further includes: The intelligent device receives a sound response indication initiated by the terminal device. The intelligent device sends a feedback sound to the terminal device based on the sound response indication. If it is determined that a sound response is successfully matched, the intelligent device allows the identity authentication process between the intelligent device and the terminal device to be enabled. In this embodiment, before determining whether to enable the identity authentication process, the intelligent device not only considers whether the terminal device is approaching the intelligent device and is relatively close to the intelligent device, but also determines, by using the sound response, whether the terminal device and the intelligent device fall within a relatively small distance range, to further accurately determine whether the terminal device held by the user is truly near the intelligent device (in other words, whether it is true that the user probably needs to unlock the smart lock) instead of being quite close as forged by an attacker, thereby more effectively avoiding unauthorized unlocking caused by a relay attack, ensuring security of the smart lock, and improving user experience.

In a possible implementation, the identity authentication process between the intelligent device and the terminal device includes: The intelligent device and the terminal device perform a security authentication process based on a pre-authenticated shared key or a public-private key pair. In this embodiment, in the identity authentication process between the terminal device and the intelligent device, an identity authentication challenge/response procedure is performed by using a shared key (for example, a symmetric key) pre-negotiated between the terminal device and the intelligent device or a public-private key pair (for example, an asymmetric key), so that the intelligent device can determine whether the terminal device is authorized, thereby implementing a subsequent secure smart unlocking service.

In a possible implementation, the intelligent device includes a plurality of smart locks; and the unlocking the smart lock includes: The intelligent device determines a target smart lock in the plurality of smart locks that is closest to the terminal device, and unlocks the target smart lock. In this embodiment, when the intelligent device includes a plurality of smart locks, the intelligent device may further determine a smart lock closer to the terminal device, and correspondingly unlock the smart lock, to provide a more personalized smart unlocking service for the user, thereby further improving user experience.

In a possible implementation, that the terminal device is approaching the intelligent device includes at least one of the following: Bluetooth signal strength between the terminal device and the intelligent device is becoming stronger; a GPS distance between the terminal device and the intelligent device is becoming shorter; or an IR-UWB distance between the terminal device and the intelligent device is becoming shorter. In this embodiment, the intelligent device may specifically monitor the distance change trend between the intelligent device and the terminal device by using one or more of the Bluetooth signal strength information, the GPS ranging information, or the IR-UWB ranging information, to determine the distance between the intelligent device and the terminal device and determine whether the terminal device is approaching the intelligent device.

In a possible implementation, that the terminal device is being away from the intelligent device includes at least one of the following: Bluetooth signal strength between the terminal device and the intelligent device is becoming weaker; a GPS distance between the terminal device and the intelligent device is becoming longer; or an IR-UWB distance between the terminal device and the intelligent device is becoming longer. In this embodiment, the intelligent device may specifically monitor the distance change trend between the intelligent device and the terminal device by using one or more of the Bluetooth signal strength information, the GPS ranging information, or the IR-UWB ranging information, to determine the distance between the intelligent device and the terminal device and determine whether the terminal device is being away from the intelligent device.

According to a third aspect, an embodiment of the present invention provides a smart lock unlocking method. The method may include: A terminal device monitors a distance change trend between the terminal device and an intelligent device, where the intelligent device includes a smart lock. If the terminal device determines that the terminal device is approaching the intelligent device and a distance between the terminal device and the intelligent device is less than a first distance threshold, the terminal device enables an identity authentication process between the terminal device and the intelligent device. The intelligent device unlocks the smart lock when identity authentication between the terminal device and the intelligent device succeeds. In this embodiment, the terminal device monitors the distance change trend between the terminal device and the intelligent device in which the smart lock is located, and enables the identity authentication process between the terminal device and the intelligent device only when the terminal device determines that the terminal device is approaching the intelligent device and the distance is less than a specific threshold, and the intelligent device unlocks the smart lock after identity authentication succeeds. Before enabling the identity authentication process, the terminal device not only considers the distance between the terminal device and the intelligent device, but also monitors the distance change trend between the terminal device and the intelligent device to determine whether the terminal device is approaching the intelligent device, in other words, fully determines whether a user holding the terminal device has an unlocking intention, to avoid enabling the identity authentication process only by determining the distance (within a communication range of a near field communication manner), so that a potential risk that an attacker can perform unlocking without authorization only by using a relay attack to forge an illusion of a short distance is avoided, thereby greatly improving unlocking security of a digital key.

According to a fourth aspect, an embodiment of the present invention provides a terminal device. The terminal device may include: a monitoring unit, configured to monitor a distance change trend between the terminal device and an intelligent device, where the intelligent device includes a smart lock; an identity authentication unit, configured to: if it is determined that the terminal device is approaching the intelligent device and a distance between the terminal device and the intelligent device is less than a first distance threshold, enable an identity authentication process between the terminal device and the intelligent device; and an unlocking unit, configured to unlock the smart lock when identity authentication between the terminal device and the intelligent device succeeds.

In a possible implementation, the terminal device further includes a triggering unit, configured to: when the distance between the terminal device and the intelligent device is less than a second distance threshold, establish a communication connection to the intelligent device through Bluetooth, and trigger the monitoring unit to monitor the distance change trend between the terminal device and the intelligent device, where the second distance threshold is greater than the first distance threshold.

In a possible implementation, the terminal device further includes a locking unit, configured to lock the smart lock if it is determined that the terminal device is being away from the intelligent device and the distance between the terminal device and the intelligent device is greater than a third distance threshold.

In a possible implementation, the monitoring unit is further configured to determine a distance change between the terminal device and the intelligent device based on first distance information between the terminal device and the intelligent device, where the first distance information includes one or more of Bluetooth signal strength change information, global positioning system (GPS) ranging information, or impulse radio ultra-wideband (IR-UWB) ranging information.

In a possible implementation, the terminal device further includes: a comparison unit, configured to compare an environment parameter of the terminal device and a corresponding environment parameter of the intelligent device, where the environment parameter includes one or more of temperature, humidity, light intensity, smell, or noise; a determining unit, configured to determine, based on a comparison result, whether the terminal device and the intelligent device are located in a same environment; and a first enabling unit, configured to: if it is determined that the terminal device and the intelligent device are located in a same environment, allow the identity authentication process between the terminal device and the intelligent device to be enabled.

In a possible implementation, the terminal device further includes: a response unit, configured to initiate a sound response indication to the intelligent device; a feedback unit, configured to receive a feedback sound sent by the intelligent device based on the sound response indication; and a second enabling unit, configured to: if it is determined that a sound response is successfully matched, allow the identity authentication process between the terminal device and the intelligent device to be enabled.

In a possible implementation, the identity authentication process between the terminal device and the intelligent device includes: The terminal device and the intelligent device perform a security authentication process based on a pre-authenticated shared key or a public-private key pair.

In a possible implementation, the intelligent device includes a plurality of smart locks; and the unlocking unit is further configured to: determine a target smart lock in the plurality of smart locks that is closest to the terminal device, and unlock the target smart lock.

According to a fifth aspect, an embodiment of the present invention provides an intelligent device. The intelligent device may include: a monitoring unit, configured to monitor a distance change trend between the intelligent device and a terminal device, where the intelligent device includes a smart lock; an identity authentication unit, configured to: if it is determined that the terminal device is approaching the intelligent device and a distance between the intelligent device and the terminal device is less than a first distance threshold, enable an identity authentication process between the intelligent device and the terminal device; and an unlocking unit, configured to unlock the smart lock when identity authentication between the intelligent device and the terminal device succeeds.

In a possible implementation, the intelligent device further includes a triggering unit, configured to: when the distance between the intelligent device and the terminal device is less than a second distance threshold, establish a communication connection to the terminal device through Bluetooth, and trigger the monitoring unit to monitor the distance change trend between the intelligent device and the terminal device, where the second distance threshold is greater than the first distance threshold.

In a possible implementation, the intelligent device further includes a locking unit, configured to lock the smart lock if it is determined that the intelligent device is being away from the terminal device and the distance between the intelligent device and the terminal device is greater than the second distance threshold.

In a possible implementation, the monitoring unit is further configured to determine a distance change between the intelligent device and the terminal device based on first distance information between the intelligent device and the terminal device, where the first distance information includes one or more of Bluetooth signal strength change information, global positioning system (GPS) ranging information, or impulse radio ultra-wideband (IR-UWB) ranging information.

In a possible implementation, the intelligent device further includes: a comparison unit, configured to compare an environment parameter of the intelligent device and a corresponding environment parameter of the terminal device, where the environment parameter includes one or more of temperature, humidity, light intensity, smell, or noise; a determining unit, configured to determine, based on a comparison result, whether the intelligent device and the terminal device are located in a same environment; and a first enabling unit, configured to: if it is determined that the intelligent device and the terminal device are located in a same environment, allow the identity authentication process between the intelligent device and the terminal device to be enabled.

In a possible implementation, the intelligent device further includes: a response unit, configured to receive a sound response indication initiated by the terminal device; a feedback unit, configured to send a feedback sound to the terminal device based on the sound response indication; and a second enabling unit, configured to: if it is determined that a sound response is successfully matched, allow the identity authentication process between the intelligent device and the terminal device to be enabled.

In a possible implementation, the identity authentication process between the intelligent device and the terminal device includes: The intelligent device and the terminal device perform a security authentication process based on a pre-authenticated shared key or a public-private key pair.

In a possible implementation, the intelligent device includes a plurality of smart locks; and the unlocking unit is further configured to: determine a target smart lock in the plurality of smart locks that is closest to the terminal device, and unlock the target smart lock.

According to a sixth aspect, an embodiment of the present invention provides a terminal device. The terminal device may include a processor and a memory.

The memory is configured to store program code, and the processor is configured to invoke the program code stored in the memory, to perform the following steps: monitoring a distance change trend between the terminal device and an intelligent device, where the intelligent device includes a smart lock; if it is determined that the terminal device is approaching the intelligent device and a distance between the terminal device and the intelligent device is less than a first distance threshold, enabling an identity authentication process between the terminal device and the intelligent device; and unlocking the smart lock when identity authentication between the terminal device and the intelligent device succeeds.

In a possible implementation, the processor is further configured to: when the distance between the terminal device and the intelligent device is less than a second distance threshold, establish a communication connection to the intelligent device through Bluetooth, and trigger the distance change trend between the terminal device and the intelligent device to be monitored, where the second distance threshold is greater than the first distance threshold.

In a possible implementation, the processor is further configured to lock the smart lock if it is determined that the terminal device is being away from the intelligent device and the distance between the terminal device and the intelligent device is greater than a third distance threshold.

In a possible implementation, the processor is further configured to determine a distance change between the terminal device and the intelligent device based on first distance information between the terminal device and the intelligent device, where the first distance information includes one or more of Bluetooth signal strength change information, global positioning system (GPS) ranging information, or impulse radio ultra-wideband (IR-UWB) ranging information.

In a possible implementation, the processor is further configured to: compare an environment parameter of the terminal device and a corresponding environment parameter of the intelligent device, where the environment parameter includes one or more of temperature, humidity, light intensity, smell, or noise; determine, based on a comparison result, whether the terminal device and the intelligent device are located in a same environment; and if it is determined that the terminal device and the intelligent device are located in a same environment, allow the identity authentication process between the terminal device and the intelligent device to be enabled.

In a possible implementation, the processor is further configured to: initiate a sound response indication to the intelligent device; and
receive a feedback sound sent by the intelligent device based on the sound response indication; and if it is determined that a sound response is successfully matched, allow the identity authentication process between the terminal device and the intelligent device to be enabled.

In a possible implementation, the identity authentication process between the terminal device and the intelligent device includes: The terminal device and the intelligent device perform a security authentication process based on a pre-authenticated shared key or a public-private key pair.

In a possible implementation, the intelligent device includes a plurality of smart locks; and the processor is further configured to: determine a target smart lock in the plurality of smart locks that is closest to the terminal device, and unlock the target smart lock.

According to a seventh aspect, an embodiment of the present invention provides an intelligent device, and the intelligent device may include a processor and a memory. The memory is configured to store program code, and the processor is configured to invoke the program code stored in the memory, to perform the following steps:
monitoring a distance change trend between the intelligent device and a terminal device, where the intelligent device includes a smart lock; if it is determined that the terminal device is approaching the intelligent device and a distance between the intelligent device and the terminal device is less than a first distance threshold, enabling an identity authentication process between the intelligent device and the terminal device; and unlocking the smart lock when identity authentication between the intelligent device and the terminal device succeeds.

In a possible implementation, the intelligent device establishes a communication connection to the terminal device through Bluetooth, and the processor is further configured to: when the distance between the intelligent device and the terminal device is less than a second distance threshold, trigger the distance change trend between the intelligent device and the terminal device to be monitored, where the second distance threshold is greater than the first distance threshold.

In a possible implementation, the processor is further configured to lock the smart lock if it is determined that the intelligent device is being away from the terminal device and the distance between the intelligent device and the terminal device is greater than the second distance threshold.

In a possible implementation, the processor is further configured to determine a distance change between the intelligent device and the terminal device based on first distance information between the intelligent device and the terminal device, where the first distance information includes one or more of Bluetooth signal strength change information, global positioning system (GPS) ranging information, or impulse radio ultra-wideband (IR-UWB) ranging information.

In a possible implementation, the processor is further configured to: compare an environment parameter of the intelligent device and a corresponding environment parameter of the terminal device, where the environment parameter includes one or more of temperature, humidity, light intensity, smell, or noise; determine, based on a comparison result, whether the intelligent device and the terminal device are located in a same environment; and if it is determined that the intelligent device and the terminal device are located in a same environment, allow the identity authentication process between the intelligent device and the terminal device to be enabled.

In a possible implementation, the processor is further configured to: receive a sound response indication initiated by the terminal device; send a feedback sound to the terminal device based on the sound response indication; and if it is determined that a sound response is successfully matched, allow the identity authentication process between the intelligent device and the terminal device to be enabled.

In a possible implementation, the identity authentication process between the intelligent device and the terminal device includes: The intelligent device and the terminal device perform a security authentication process based on a pre-authenticated shared key or a public-private key pair.

In a possible implementation, the intelligent device includes a plurality of smart locks; and the processor is further configured to: determine a target smart lock in the plurality of smart locks that is closest to the terminal device, and unlock the target smart lock.

According to an eighth aspect, this application provides a terminal device. The terminal device has a function of implementing any smart lock unlocking method provided in the first aspect. The function may be implemented by hardware, or may be implemented by hardware executing corresponding software. The hardware or software includes one or more modules corresponding to the function.

According to a ninth aspect, this application provides an intelligent device. The intelligent device has a function of implementing any smart lock unlocking method provided in the second aspect. The function may be implemented by hardware, or may be implemented by hardware executing corresponding software. The hardware or software includes one or more modules corresponding to the function.

According to a tenth aspect, this application provides a terminal device, and the terminal device includes a processor. The processor is configured to support the terminal device in performing a corresponding function in any smart lock unlocking method provided in the first aspect. The terminal device may further include a memory. The memory is coupled to the processor, and the memory stores program instructions and data that are necessary for the terminal device. The terminal device may further include a communications interface used for communication between the terminal device and another device or a communications network.

According to an eleventh aspect, this application provides an intelligent device. The intelligent device includes a processor, and the processor is configured to support the intelligent device in performing a corresponding function in any smart lock unlocking method provided in the second aspect. The intelligent device further includes a memory. The memory is configured to be coupled to the processor, and the memory stores program instructions and data that are necessary for the intelligent device. The device may further include a communications interface used for communication between the intelligent device and another device or a communications network.

According to a twelfth aspect, this application provides a computer storage medium, configured to store computer software instructions used by the terminal device in the foregoing first aspect, and the computer software instructions include a program designed to implement the foregoing aspects.

According to a thirteenth aspect, this application provides a computer storage medium, configured to store computer software instructions used by the intelligent device in the foregoing second aspect, and the computer software instructions include a program designed to implement the foregoing aspects.

According to a fourteenth aspect, an embodiment of the present invention provides a computer program. The computer program includes instructions, and when the computer program is executed by a terminal device, the terminal device can perform a procedure performed by the terminal device in any smart lock unlocking method in the first aspect.

According to a fifteenth aspect, an embodiment of the present invention provides a computer program. The computer program includes instructions, and when the computer program is executed by an intelligent device, the intelligent device can perform a procedure performed by the intelligent device in any smart lock unlocking method in the second aspect.

According to a sixteenth aspect, this application provides a chip system. The chip system includes a processor, configured to support a terminal device in implementing functions in the first aspect. In a possible design, the chip system further includes a memory. The memory is configured to store program instructions and data that are necessary for the terminal device. The chip system may include a chip, or may include a chip and another discrete component.

According to a seventeenth aspect, this application provides a chip system. The chip system includes a processor, configured to support an intelligent device in implementing functions in the second aspect. In a possible design, the chip system further includes a memory. The memory is configured to store program instructions and data that are necessary for the intelligent device. The chip system may include a chip, or may include a chip and another discrete component.

BRIEF DESCRIPTION OF DRAWINGS

FIG. 3 is a schematic diagram of an architecture of another smart lock unlocking system according to an embodiment of the present invention;

FIG. 4 is a schematic flowchart of a smart lock unlocking method according to an embodiment of the present invention;

DESCRIPTION OF EMBODIMENTS

Figure 1:
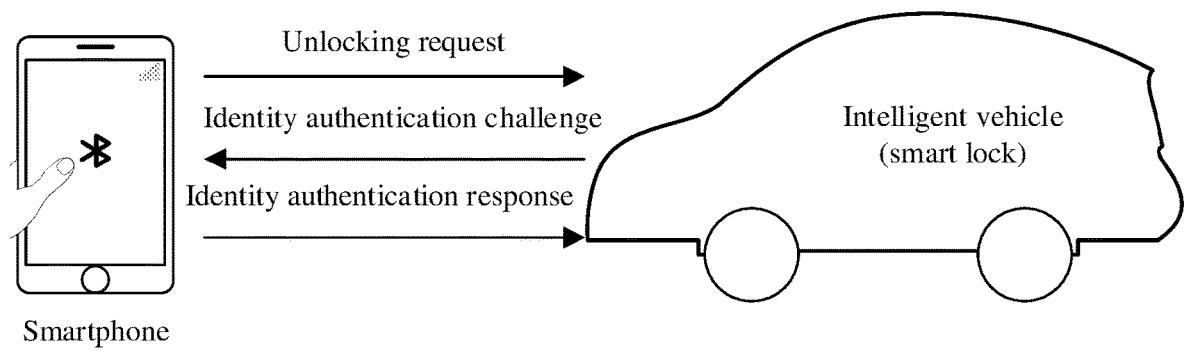
FIG. 1 is a schematic diagram of performing unlocking by using a digital vehicle key in the conventional technology.

The following describes embodiments of the present invention with reference to accompanying drawings in the embodiments of the present invention.

In the specification, claims, and accompanying drawings of this application, the terms "first", "second", "third", "fourth", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

Some terms in this application are first described, to help a person skilled in the art have a better understanding.

(1) Near field communication (NFC): Devices (for example, mobile phones) using the NFC technology can exchange data when the devices are close to each other. The technology is evolved by integrating a contactless radio frequency identification (RFID) technology and an interconnection technology. By integrating functions of an induction card reader, an induction card, and point-to-point communication into a single chip, the technology implements application such as mobile payment, e-ticketing, door status control, mobile identity identification, and anti-counterfeiting by using a mobile terminal.

(2) Bluetooth is a short-range wireless communications technology, and can implement data exchange between a fixed device and a mobile device. Generally, BR/EDR Bluetooth before Bluetooth 3.0 is referred to as conventional Bluetooth, and LE Bluetooth complying with Bluetooth 4.0 is referred to as Bluetooth low energy. A Bluetooth low energy (BLE) technology is a short-range, low-cost, interoperable wireless technology, and the technology uses many intelligent means to minimize power consumption.

(3) A global positioning system (GPS) is a system that uses a GPS positioning satellite to perform positioning and navigation on a global scale in real time. The GPS is an omni-directional, all-weather, all-time, and high-precision satellite navigation system, and can provide low-cost and high-precision navigation information such as three-dimensional positions, speeds, and accurate timing for global users.

(4) A beacon is a "proximity system". In this system, an application running on a smartphone, a tablet computer, a wearable device, or another computing device may respond to a signal sent by a "beacon device". The beacon device is a small inexpensive physical device, and may be placed in some places to send information to a "response device" within a specific distance. The beacon device works in the following manner: A device equipped with a Bluetooth low energy (BLE) communication function sends an ID specific to the device to a surrounding device by using a BLE technology, and application software that receives the ID takes some actions based on the ID.

(5) A vehicle communications system (telematics box, T-Box), usually referred to as an intelligent vehicle terminal in an internet of vehicles system, directly communicates with a Controller Area Network (CAN) bus of a vehicle to obtain a vehicle body status and vehicle status information, uploads these parameters to a background of a telematics service provider (TSP) of the vehicle, and may also receive an instruction delivered by the background and send an execution result back. Based on this, a remote control function can be extended to a mobile phone App, a smart key, and the like.

(6) A mobile phone application (App) originally means "application". With development of the mobile Internet and popularization of smartphones, a new meaning is assigned to the APP. To be specific, the APP is an application of a smartphone.

(7) Ultra-wideband (UWB) is a wireless communications technology in which data is transmitted at a high speed and quite low power within a short distance. The UWB has many advantages such as a strong anti-interference capability, a high transmission rate, extremely large bandwidth, low power consumption, and low transmit power, and is mainly applied to fields such as indoor communication, a home network, location measurement, and radar detection. Impulse radio ultra-wideband (IR-UWB) is the most classical implementation of ultra-wideband (UWB) communication. A wireless real-time high-precision positioning platform of the IR-UWB technology sends signals in real time by relying on an integrated network including a plurality of powerful data collection sensors, and is equivalent to an indoor GPS, but is more accurate.

(8) A cryptographic hash function is a kind of hash function. The cryptographic hash function is considered as a one-way function, meaning that it is extremely difficult to derive input data from a result output by the hash function. Such a one-way function is referred to as the "workhorse of modern cryptology". The input data of this hash function is usually referred to as a message, and the output result of the hash function is often referred to as a message digest or a digest. In information security, many important applications such as digital signature and message authentication code are implemented by using the cryptographic hash function.

Figure 2:
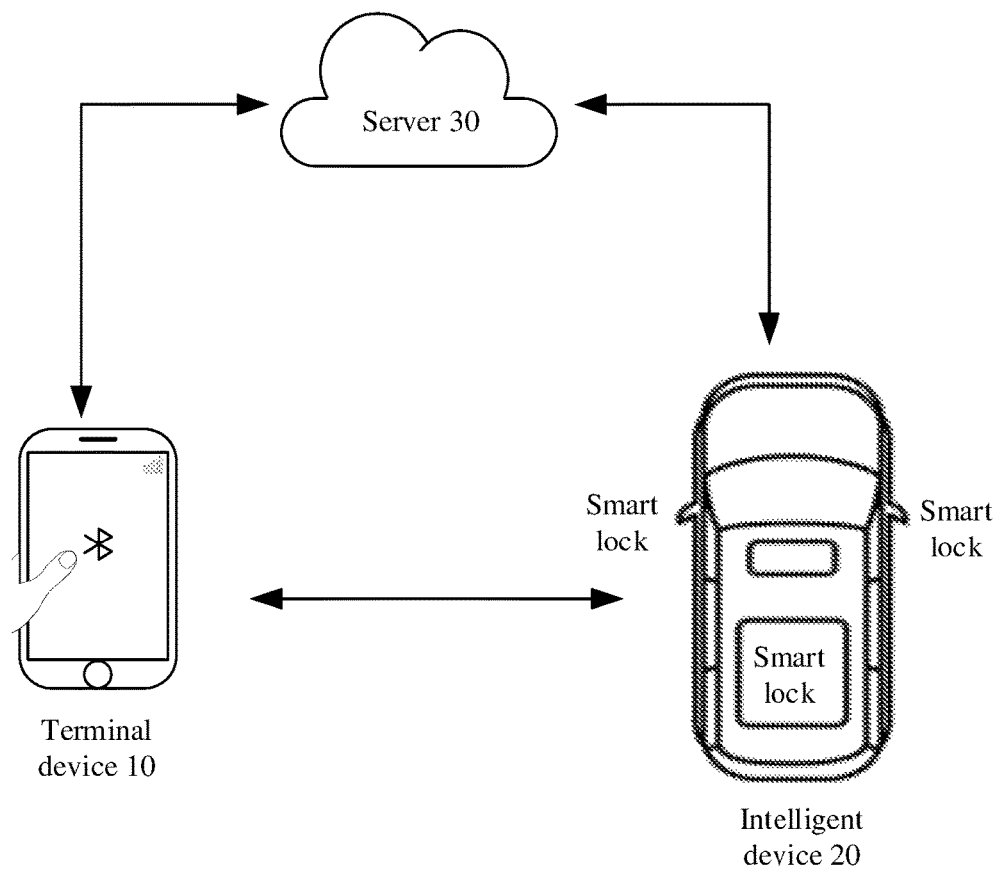
FIG. 2 is a schematic diagram of an architecture of a smart lock unlocking system according to an embodiment of the present invention.

For ease of understanding of the embodiments of the present invention, the following first describes one of system architectures on which the embodiments of the present invention are based. FIG. 2 is a schematic architectural diagram of a smart lock unlocking system according to an embodiment of the present invention. The system architecture may include a terminal device 10 (a smartphone of a vehicle owner is used as an example in FIG. 2, and the terminal device 10 may be alternatively a smart band, smart glasses, or the like), an intelligent device 20 (an intelligent vehicle is used as an example in FIG. 2, and the intelligent device 20 may be alternatively a company door status control device, a home door lock, a safe, or the like), and a server 30 (a cloud server is used as an example in FIG. 2). The intelligent device 20 includes one or more smart locks, and the terminal device 10 may be bound to the intelligent device 20 by using the server 30, so that the terminal device 10 is authorized to use the smart lock, or may perform procedures such as distance monitoring, identity authentication, and smart lock unlocking/locking with the intelligent device 20 through short-range wireless communication (for example, Bluetooth, NFC, or Wi-Fi). For example, if each vehicle owner has one smartphone with a Bluetooth communication function and a networking function, the smartphone 10 of the vehicle owner may be registered in the following process:

1. A related App is installed on the smartphone 10 of the vehicle owner. The App establishes a secure channel with the server 30, initiates a registration request to the server 30, and submits a user name and a password of the vehicle owner and an authentication credential (The authentication credential is used to prove that the vehicle owner legally own the vehicle. The credential is bound to the vehicle, and may be a password, a key, public and private keys, or the like) of the intelligent vehicle 20.

2. The server 30 generates an identity key $K_O=h(K, ID_V, ID_O)$ of the vehicle owner based on the registration request initiated by the smartphone 10 of the vehicle owner, where "h(.)" is a password hash function, K is a master key of the server 30, and $ID_V$ and $ID_O$ are respectively identity information of the intelligent vehicle and identity information of the vehicle owner.

3. The server 30 sends the generated key $K_O=h(K, ID_V, ID_O)$ and a Bluetooth address of the intelligent vehicle 20 back to the App of the smartphone 10 of the vehicle owner through the secure channel, and then the server 30 updates a vehicle authorization list. The smartphone 10 may locally perform secure storage protection on the key $K_O$ and the Bluetooth address. For example, the smartphone 10 stores the key $K_O$ and the Bluetooth address in a secure element (SE) of the smartphone 10, or encrypts the key $K_O$ and the Bluetooth address in a white box confused with code.

4. Finally, the server 30 and the intelligent vehicle 20 perform authentication on each other and establish a secure channel, and the server sends information such as the identity information of the vehicle owner, $K_O$, and Bluetooth pairing information (for example, a Bluetooth address of the terminal device or a Bluetooth pairing authentication code (PIN code)) to the intelligent vehicle 20. Subsequently, in an identity authentication process of the smartphone and the intelligent vehicle, identity verification of both parties may be performed by using $K_O$.

In the foregoing system architecture, it is assumed that one intelligent vehicle corresponds to one vehicle owner. Actually, one intelligent vehicle may correspond to a plurality of vehicle owners. To avoid the loss of generality, the vehicle owner may be set to have administrator rights to perform authorization or blacklist management on another user. To unlock/lock a smart lock, the vehicle owner needs to perform registration in advance, and another user needs to be authorized by the vehicle owner in advance.

FIG. 3 is a schematic architectural diagram of another smart lock unlocking system according to an embodiment of the present invention. The system architecture may include a terminal device 10-A and at least one terminal device 10-B (an example in which 10-A is a smartphone of a vehicle owner and 10-B is a smartphone of a to-be-authorized user is used in FIG. 3), an intelligent device 20 (an intelligent vehicle is used as an example in FIG. 3), and a related server (a cloud server 30 is used as an example in FIG. 3). The intelligent device 20 includes one or more smart locks. The terminal device 10-A may be bound to the intelligent device 20 by using the server 30 to obtain use permission of the smart lock, and the terminal device 10-B may send identity information of the terminal device 10-B to the server 30 by using the terminal device 10-A, so that the terminal device 10-B can also obtain use permission of the smart lock of the intelligent device 20 by using the server 30. Both the terminal device 10-A and the terminal device 10-B obtaining the permission can perform procedures such as distance monitoring, identity authentication, and smart lock unlocking/locking with the intelligent device 20 through short-range wireless communication (for example, Bluetooth, NFC, or Wi-Fi). For example, the vehicle owner may grant permission to another user in the following process:

1. The smartphone 10-A of the vehicle owner may grant specific access permission to the smartphone 10-B of another user (for example, a family member or a friend). The smartphone 10-A of the vehicle owner establishes a secure channel and performs identity authentication with the server 30.

2. After the server 30 can authenticate an identity of the smartphone 10-A, the vehicle owner sends identity information $ID_U$ of the to-be-authorized user (delegated user) and an authorization policy $P_U$ to the server 30 by using the smartphone 10-A.

3. Then the server 30 updates an intelligent vehicle authorization list, establishes a secure channel with the to-be-authorized user, and sends a key $K_U$ and the authorization policy $P_U$ to the smartphone 10-B of the delegated user. $K_U$ may be calculated as follows: $K_U=h(K_O, ID_U, P_U)$.

4. Finally, the server 30 establishes a secure channel with the corresponding intelligent vehicle 20, and sends the identity information $ID_U$ of the delegated user, the authorization policy $P_U$, and Bluetooth pairing information to the corresponding intelligent vehicle 20. Because the intelligent vehicle has $K_O$, the intelligent vehicle may calculate $K_U$ based on $K_O$, $ID_U$, and $P_U$ at any time. Therefore, the server does not need to transfer $K_U$ to the intelligent vehicle 20, and the intelligent vehicle 20 does not need to save $K_U$, either.

In the foregoing authorization manner of the vehicle owner, several family members (a father, a mother, and a child) in one family can use a same family-shared vehicle at different times, to share use permission of the vehicle. Alternatively, a management terminal of a vehicle rental company may perform fixed-time and fixed-place authorization on a terminal of a user who rents a vehicle, to implement rental sharing of the intelligent vehicle. In addition to the foregoing requirements of sharing a vehicle (family sharing and business sharing), the foregoing authorization manner may be further applied to unlocking scenarios such as a company door status control device, a home door lock, and a safe. This is not specifically limited in the embodiments of the present invention, and details are not described herein.

FIG. 4 is a schematic flowchart of a smart lock unlocking method according to an embodiment of the present invention. The method may be applied to the foregoing system architecture in FIG. 2 or FIG. 3. A terminal device in the method may be the terminal device 10 in the system architecture in FIG. 2, or may be the terminal device 10-A or the terminal device 10-B in the system architecture in FIG. 3, and may be configured to support and perform a method procedure shown in FIG. 4. The following describes the method from a perspective of the terminal device with reference to FIG. 4. The method may include the following steps S401 to step S403.

Step S401: The terminal device monitors a distance change trend between the terminal device and an intelligent device, where the intelligent device includes a smart lock.

Specifically, the terminal device may be a smartphone, a smart band, or the like held by a user, and the intelligent device may be an intelligent vehicle, a company door status control device, a home door lock, a safe, or the like. A specific application scenario is not specifically limited in the embodiments of the present invention. Optionally, the terminal device determines a distance change between the terminal device and the intelligent device based on first distance information between the terminal device and the intelligent device. The first distance information includes one or more of Bluetooth signal strength change information, global positioning system (GPS) ranging information, or impulse radio ultra-wideband (IR-UWB) ranging information. In other words, the terminal device may monitor the distance change between the terminal device and the intelligent device based on Bluetooth signal strength, the GPS ranging information, or another ranging technology (for example, the IR-UWB technology) between the terminal device and the intelligent device. For example, when detecting that the Bluetooth signal strength between the terminal device and the intelligent device gradually increases within a preset time range, the terminal device determines that the terminal device is approaching the intelligent device; or when detecting, through ranging, that a distance between the terminal device and the intelligent device gradually decreases within a preset time range, the terminal device determines that the terminal device is approaching the intelligent device. In a specific implementation, the terminal device may obtain strength information or distance information by sampling signal strength or a distance for a plurality of times within a preset time range, to determine the distance change trend. Optionally, the intelligent device may also use the foregoing ranging manner, and exchange ranging information with the terminal device to jointly monitor the distance change trend between the intelligent device and the terminal device, to improve ranging accuracy. Optionally, before or when monitoring the distance change trend between the terminal device and the intelligent device, the terminal device may further detect, by using a sensor such as an accelerometer or a gyroscope, whether a user (for example, a vehicle owner or an authorized user) is walking, to improve ranging accuracy, thereby further avoiding a relay attack that may be caused by an attacker when the terminal device is stationary.

Step S402: If the terminal device determines that the terminal device is approaching the intelligent device and a distance between the terminal device and the intelligent device is less than a first distance threshold, enable an identity authentication process between the terminal device and the intelligent device.

Specifically, if the terminal device learns, through monitoring, that the terminal device is currently approaching the intelligent device and determines that the distance between the terminal device and the intelligent device is less than a specific threshold, it may indicate that the user holding the terminal device has an intention of unlocking the smart lock of the intelligent device. For example, the Bluetooth signal strength between the terminal device and the intelligent device is becoming stronger; a GPS distance between the terminal device and the intelligent device is becoming shorter; or an IR-UWB distance between the terminal device and the intelligent device is becoming shorter. If any one or more of the foregoing conditions are met, it may indicate that the terminal device is approaching the intelligent device, in other words, the user holding the terminal device is walking and approaching the intelligent device. "Approaching" may mean that the distance between the terminal device and the intelligent device constantly decreases, or may mean that the distance between the terminal device and the intelligent device tends to decrease. For example, the user holding the terminal device (the smartphone) walks towards the intelligent terminal (the intelligent vehicle). The user may make a straight route to the intelligent vehicle, or may make a tortuous route to the intelligent vehicle. In other words, the distance between the smartphone and the intelligent vehicle may have a tendency of unstably decreasing: decreasing→increasing→decreasing. This case also belongs to the case of approaching the intelligent device in this application. When the terminal device determines that a condition for enabling identity authentication is currently met (in other words, determines that the user holding the terminal device has an unlocking intention), the terminal device actively enables the identity authentication process between the terminal device and the intelligent device, to prove that the terminal device is an authorized terminal device that has permission to unlock the smart lock of the intelligent device. The identity authentication process may include: 1. The terminal device initiates an unlocking request to the intelligent device. 2. The intelligent device sends an identity authentication challenge to the terminal device that initiates the unlocking request. 3. The terminal device returns an identity authentication response, to reliably and effectively prevent an attacker from impersonating an authorized user to obtain control permission of the smart lock of the intelligent device, thereby ensuring a legitimate interest of an authorized visitor.

The foregoing condition for enabling identity authentication can effectively prevent an attacker from performing a relay attack by using a repeater to amplify a signal when the terminal device of the user is stationary or moves without a purpose, in other words, the attacker cannot perform a relay attack on the smart lock when the terminal device is stationary (for example, the user places the mobile phone on a table at home) or the terminal device moves without a purpose (for example, the user carrying the mobile phone normally walks or moves at home). Because the foregoing states cannot meet the condition "the terminal device is approaching the intelligent device" in the embodiments of the present invention, unlocking security of a digital key is greatly improved.

Step S403: The terminal device unlocks the smart lock when identity authentication between the terminal device and the intelligent device succeeds.

Specifically, after identity authentication between the terminal device and the intelligent device succeeds, the terminal device may unlock the smart lock of the intelligent device. The terminal device may directly send a control signal to the smart lock to control unlocking of the smart lock, or the terminal device may send a corresponding control signal to the intelligent device to control unlocking of the smart lock of the intelligent device by using a related control unit (for example, a T-Box of the vehicle) of the intelligent device, or may indicate another third-party device (for example, a cloud server or an intelligent gateway) to perform unlocking, or the like. In this case, the smart lock of the intelligent device may be securely and automatically unlocked without perception of the user holding the terminal device. For example, after shopping, the vehicle owner walks to the intelligent vehicle. If the vehicle owner carries shopping bags in both hands, the vehicle owner directly places the shopping bags into the vehicle or a trunk without putting down the shopping bags or taking out a key to open a vehicle door or the trunk. This is quite convenient.

In this embodiment, the terminal device monitors the distance change trend between the terminal device and the intelligent device in which the smart lock is located, enables the identity authentication process between the terminal device and the intelligent device only when the terminal device determines that the terminal device is approaching the intelligent device and the distance is less than a specific threshold, and unlocks the smart lock after identity authentication succeeds. Before enabling the identity authentication process, the terminal device not only considers the distance between the terminal device and the intelligent device, but also monitors the distance change trend between the terminal device and the intelligent device to determine whether the terminal device is approaching the intelligent device (for example, whether the user holding the terminal device is walking and approaching the intelligent device), in other words, fully determines whether the user holding the terminal device has an unlocking intention, to avoid enabling the identity authentication process only by determining the distance (within a communication range of a near field communication manner), so that a potential risk that an attacker can perform unlocking without authorization only by using a relay attack to forge an illusion of a short distance is avoided, thereby greatly improving unlocking security of a digital key.

Figure 5:
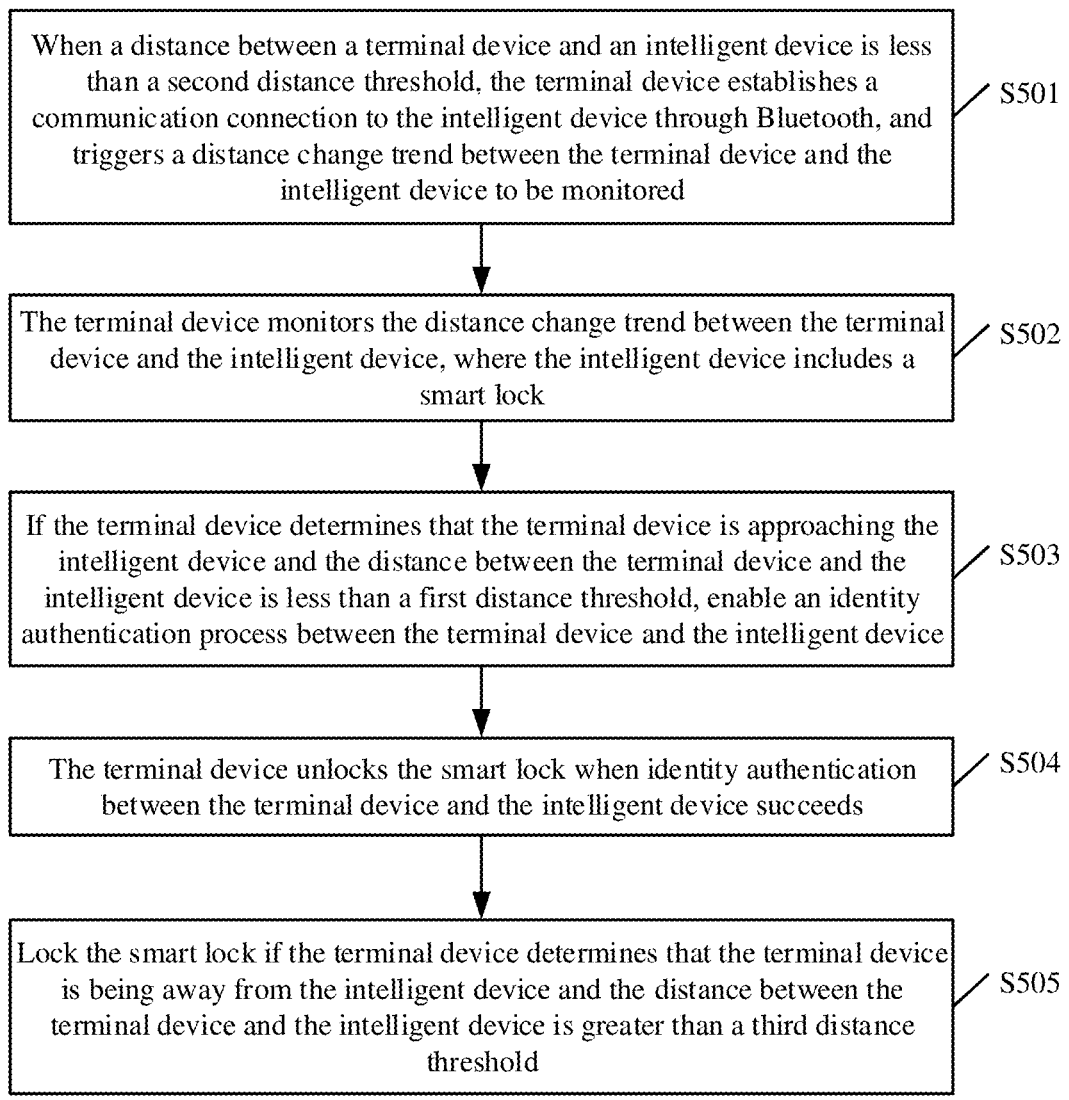
FIG. 5 is a schematic flowchart of another smart lock unlocking method according to an embodiment of the present invention.

FIG. 5 is a schematic flowchart of another smart lock unlocking method according to an embodiment of the present invention. The method may be applied to the foregoing system architecture in FIG. 2 or FIG. 3. A terminal device in the method may be the terminal device 10 in the system architecture in FIG. 2, or may be the terminal device 10-A or the terminal device 10-B in the system architecture in FIG. 3, and may be configured to support and perform a method procedure shown in FIG. 5. The following describes the method from a perspective of the terminal device with reference to FIG. 5. The method may include the following steps S501 to step S505.

Step S501: When a distance between the terminal device and an intelligent device is less than a second distance threshold, the terminal device establishes a communication connection to the intelligent device through Bluetooth, and triggers a distance change trend between the terminal device and the intelligent device to be monitored.

Specifically, when the terminal device (for example, a mobile phone) and the intelligent device (for example, a vehicle) fall within a Bluetooth communication distance range, the mobile phone and the vehicle may learn of a distance between the mobile phone and the vehicle through mutual distance estimation, to determine whether the distance between the mobile phone and the vehicle is less than a preset Bluetooth pairing distance (namely, the second distance threshold). It may be understood that the distance estimation process may be different from the subsequently triggered monitoring of the distance change trend between the terminal device and the intelligent device, and does not need to continuously monitor the distance change trend. The distance estimation process is mainly intended to enable the mobile phone and the vehicle to perform a Bluetooth pairing connection within a relatively small distance range, to avoid problems of relatively high power consumption caused after the Bluetooth pairing connection is performed excessively early at a relatively long distance and an increase in a false unlocking rate that is caused by monitoring the distance change trend excessively early. It may be understood that the terminal device and the intelligent device establish a communication connection through Bluetooth on premises that Bluetooth function options of the terminal device and the intelligent device are in an on state and the terminal device and the intelligent device are in a Bluetooth communication list of each other. After the terminal device and the intelligent device complete Bluetooth pairing, the terminal device starts to monitor the distance change trend between the terminal device and the intelligent device in real time, to perform identity authentication under a proper condition.

It may be understood that authentication is performed for data exchange in Bluetooth communication to ensure security, the first communication authentication between two Bluetooth devices is usually completed through Bluetooth pairing to ensure ease of use, and after the Bluetooth devices are paired, authentication does not need to be performed for each subsequent communication connection. Therefore, in this embodiment, the terminal device and the intelligent device may complete Bluetooth pairing only initially (for example, the terminal device and the intelligent device complete the first Bluetooth pairing in a registration process/authorization process in the embodiment in FIG. 2 or FIG. 3 or after registration/authorization). Subsequently, the terminal device and the intelligent device may perform an authentication-free pairing connection provided that the terminal device and the intelligent device fall within a Bluetooth communication distance range and a distance between the terminal device and the intelligent device is less than the second distance threshold. It can be learned that Bluetooth pairing ensures security of Bluetooth communication to some extent. However, because of simplicity of a Bluetooth pairing authentication code (PIN code), it is relatively easy to crack a security guarantee mechanism of the Bluetooth pairing authentication code. Therefore, in embodiments of this application, further identity authentication needs to be subsequently performed to perform authentication on control permission of the smart lock, so that security is improved.

It should be noted that the terminal device and the intelligent device may perform a communication connection in another short-range wireless communication manner, for example, ZigBee, Wi-Fi, or NFC. This is not specifically limited in embodiments of this application. An NFC-based smart unlocking system is also subject to a relay attack. In an example of a scenario of unlocking a vehicle lock, because a communication range of NFC is relatively small (a vehicle owner needs to be relatively close to a vehicle), a repeater device of an attacker also needs to be quite close to the vehicle owner to perform a relay attack, and therefore is easily noticed by the vehicle owner. In comparison, a wireless communication distance of Bluetooth is longer, so that a Bluetooth-based digital vehicle key system is more likely to be subject to a relay attack. Therefore, if the terminal device communicates with the intelligent device through Bluetooth, using this embodiment can resolve a relay attack problem more effectively, so that experience of security, intelligence, and unlocking without perception is provided for a user. It may be understood that in this embodiment, relay attacks in scenarios such as ZigBee and Wi-Fi can also be avoided. Details are not described herein.

In this embodiment, the terminal device communicates with the intelligent device through Bluetooth, and a Bluetooth communication range usually ranges from dozens to hundreds of meters. If the terminal device starts to monitor the distance change trend when the terminal device and the intelligent device fall within a relatively large Bluetooth communication range, monitoring power consumption of the terminal device may be relatively high. In addition, when the distance is relatively long, it is usually unable to more effectively determine whether a user holding the terminal device has an unlocking intention. Therefore, in this embodiment, without affecting the determination of unlocking condition, when the distance between the terminal device and the intelligent device is relatively short, a Bluetooth pairing connection is performed, and monitoring of the distance change trend is triggered, so that power consumption of the terminal device is reduced, and the accuracy of determining unlocking condition is improved.

Step S502: The terminal device monitors the distance change trend between the terminal device and the intelligent device, where the intelligent device includes a smart lock.

Specifically, for step S502, refer to step S401 in the embodiment in FIG. 4. Details are not described herein again.

In a possible implementation, a distance change between the terminal device and the intelligent device is determined based on first distance information between the terminal device and the intelligent device that is monitored by the terminal device and/or second distance information between the intelligent device and the terminal device that is monitored by the intelligent device, where the first distance information includes one or more of Bluetooth signal strength change information, global positioning system (GPS) ranging information, or impulse radio ultra-wideband (IR-UWB) ranging information, and the second distance information includes one or more of Bluetooth signal strength change information, GPS ranging information, or IR-UWB ranging information. In other words, in this embodiment, not only the terminal device can perform monitoring, but also the intelligent device can perform monitoring. Further, both the terminal device and the intelligent device may monitor the distance change trend, so that monitoring accuracy is improved.

Step S503: If the terminal device determines that the terminal device is approaching the intelligent device and a distance between the terminal device and the intelligent device is less than a first distance threshold, enable an identity authentication process between the terminal device and the intelligent device.

Specifically, for step S503, refer to step S402 in the embodiment in FIG. 4. Details are not described herein again.

In a possible implementation, the identity authentication process between the terminal device and the intelligent device includes: The terminal device and the intelligent device perform a security authentication process based on a pre-authenticated shared key or a public-private key pair.

For the manner based on the pre-authenticated shared key, refer to the key $K_O$ that is shared by the terminal device (for example, the smartphone of the vehicle owner) and the intelligent device (for example, the intelligent vehicle) and that is correspondingly calculated in the foregoing embodiments in FIG. 2 and FIG. 3. In this case, both parties may perform challenge-response-based bidirectional identity authentication by using the shared key $K_O$. In addition, as described in the foregoing embodiment in FIG. 3, the intelligent device may calculate $K_U$ of a delegated user (a terminal device) in real time. Therefore, the intelligent device and the terminal device of the delegated user may also perform challenge-response-based bidirectional identity authentication by using $K_U$.

The shared key is used for the foregoing identity authentication. In this embodiment, the public-private key pair may be alternatively used to perform identity authentication. Specifically, in a registration phase of the terminal device (for example, a smartphone of a vehicle owner), the smartphone of the vehicle owner does not need to obtain $K_O$: The vehicle owner generates a public-private key pair ($PK_O$, $SK_O$) used for digital signature, registers an identity of the vehicle owner with a server, and sends the public key $PK_O$ and Bluetooth address information to the intelligent device (an intelligent vehicle of the vehicle owner, referred to as a vehicle) by using the server. The vehicle owner safely keeps $SK_O$. In an authorization phase of the vehicle owner, the vehicle owner generates a public-private key pair ($PK_U$, $SK_U$) used for digital signature, transmits, by using the server, ($PK_U$, $SK_U$) to the terminal device used by the delegated user, and sends $PK_U$, an authorization policy $P_U$, and Bluetooth pairing information of the delegated user with a corresponding vehicle through registration by using the server. In this way, in a subsequent process of opening/closing a vehicle door, during identity authentication, the vehicle owner can directly use $SK_O$ and the delegated user can directly use $SK_U$ to sign a challenge sent by the vehicle, so that identity authentication is implemented.

Step S504: The terminal device unlocks the smart lock when identity authentication between the terminal device and the intelligent device succeeds.

Specifically, for step S504, refer to step S403 in the embodiment in FIG. 4. Details are not described herein again.

In a possible implementation, the intelligent device includes a plurality of smart locks; and the unlocking the smart lock includes: The terminal device determines a closest target smart lock in the plurality of smart locks, and unlocks the target smart lock. In this embodiment, when the intelligent device includes a plurality of smart locks, the terminal device may further determine a smart lock closer to the terminal device, and correspondingly unlock the smart lock, to provide a more personalized smart unlocking service for the user, thereby further improving user experience. For example, the terminal device is a mobile phone, the intelligent device is an intelligent vehicle, and the smart lock is a vehicle door lock. A Bluetooth beacon is disposed on each vehicle door lock of the intelligent vehicle, and Bluetooth beacons are separately placed at a driver's door, a passenger's door, and a trunk. The intelligent vehicle may determine, based on strength of Bluetooth signals of the mobile phone that are received by a plurality of beacons, a beacon closer to an owner of the mobile phone, and determine an intention of opening a corresponding vehicle door or trunk door.

It should be noted that for the intelligent device (for example, a vehicle), the vehicle needs to manage an identifier: "locked," which is used to indicate a current status of a vehicle door/trunk door. It is assumed that locked=1 indicates that the vehicle door is in a closed state, and locked=0 indicates that the vehicle door is in an open state. If a driver manually closes the vehicle door in the vehicle or the vehicle starts, the vehicle changes a value of the identifier "locked" to 1; or if a driver manually opens the vehicle door in the vehicle, the vehicle changes a value of the identifier "locked" to 0. Therefore, when the value of the identifier "locked" maintained by the vehicle is 1, if the mobile phone/the vehicle detects that an intention of the user is "open" and a distance between the mobile phone and the vehicle is less than a preset opening distance (in other words, the condition corresponding to step S503 is met), the mobile phone/the vehicle enables an identity authentication process. If the vehicle and the mobile phone complete an identity authentication protocol, the vehicle opens a corresponding vehicle device, and sets the value of the identifier locked to 0. When the value of the identifier "locked" maintained by the vehicle is 0, if the mobile phone/the vehicle detects that an intention of the user is "close" and a distance between the mobile phone and the vehicle is greater than a preset closing distance, the mobile phone/the vehicle locks all smart locks.

In a possible implementation, before the enabling of an identity authentication process between the terminal device and the intelligent device, the method further includes: The terminal device compares an environment parameter of the terminal device and a corresponding environment parameter of the intelligent device, where the environment parameter includes one or more of temperature, humidity, light intensity, smell, or noise. The terminal device determines, based on a comparison result, whether the terminal device and the intelligent device are located in a same environment. If yes, the terminal device allows the identity authentication process between the terminal device and the intelligent device to be enabled. In other words, before determining whether to enable the identity authentication process, the terminal device not only considers whether the terminal device is approaching the intelligent device and is relatively close to the intelligent device, but also may determine, by using the environment parameters, whether the terminal device and the intelligent device are located in a same environment, to further accurately determine whether the terminal device held by the user is truly near the intelligent device (in other words, whether it is true that the user probably needs to unlock the smart lock) instead of being quite close as forged by an attacker, thereby more effectively avoiding unauthorized unlocking caused by a relay attack, ensuring security of the smart lock, and improving user experience.

In a possible implementation, before the enabling of an identity authentication process between the terminal device and the intelligent device, the method further includes: The terminal device initiates a sound response indication to the intelligent device. The terminal device receives a feedback sound sent by the intelligent device based on the sound response indication. If it is determined that a sound response is successfully matched, the terminal device allows the identity authentication process between the terminal device and the intelligent device to be enabled. In other words, a multi-sensor mutual check technology may be used to further reduce a threat of a relay attack. Specifically, a sound response technology is used. For example, the mobile phone sends a digital challenge to the vehicle (for example, 0100), and the vehicle whistles or emits an ultrasonic wave to make a corresponding response (for example, a short-long-short-short response). Authentication succeeds if the mobile phone can receive a corresponding whistle or ultrasonic wave and the whistle or the ultrasonic wave matches the sent challenge. In this embodiment, before determining whether to enable the identity authentication process, the terminal device not only considers whether the terminal device is approaching the intelligent device and is relatively close to the intelligent device, but also determines, by using the sound response, whether the terminal device and the intelligent device fall within a relatively small distance range, to further accurately determine whether the terminal device held by the user is truly near the intelligent device (in other words, whether it is true that the user probably needs to unlock the smart lock) instead of being quite close as forged by an attacker, thereby more effectively avoiding unauthorized unlocking caused by a relay attack, ensuring security of the smart lock, and improving user experience. Optionally, the sound response challenge may be further implemented together with the determination of foregoing environment parameter(s). To be specific, the terminal device not only determines whether the terminal device is approaching the intelligent device and is relatively close to the intelligent device, but also performs determining of the sound response challenge and whether the terminal device and the intelligent device are located in a same environment, to further improve determining accuracy.

Step S505: Lock the smart lock if the terminal device determines that the terminal device is being away from the intelligent device and the distance between the terminal device and the intelligent device is greater than a third distance threshold.

Specifically, that the terminal device is being away from the intelligent device includes at least one of the following: Bluetooth signal strength between the terminal device and the intelligent device is becoming weaker; a GPS distance between the terminal device and the intelligent device is becoming longer; or an IR-UWB distance between the terminal device and the intelligent device is becoming longer. In this embodiment, the terminal device further determines, by monitoring the distance change trend between the terminal device and the intelligent device, whether the terminal device is being away from the intelligent device, in other words, fully determines whether the user holding the terminal device has an intention of locking the smart lock, to prevent the user from performing a manual operation. For example, when it is determined that the terminal device is being away from a company door status control device, a home door lock, a vehicle door, a safe, a shared bicycle, or the like and a distance exceeds a specific threshold, a corresponding smart lock is automatically locked without a manual operation or perception of the user. This is convenient and fast, and achieves good user experience.

Figure 6:
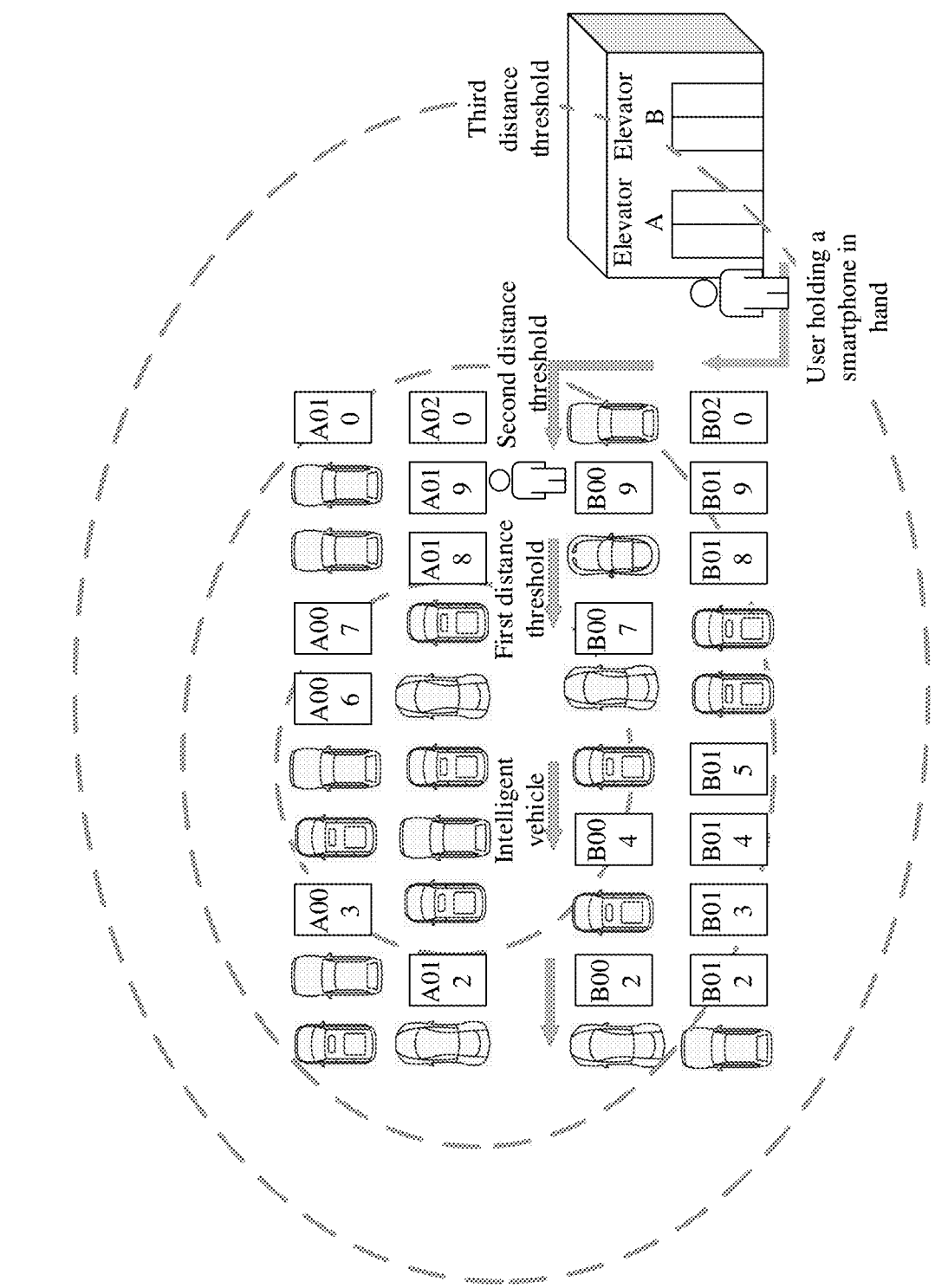
FIG. 6 is a schematic diagram of an application scenario of smart unlocking according to an embodiment of the present invention.

FIG. 6 is a schematic diagram of an application scenario of smart unlocking according to an embodiment of the present invention. In the figure, an intelligent vehicle (e.g., an intelligent vehicle in FIG. 6) is used as a center, different dashed circles are used to represent area ranges corresponding to a first distance threshold, a second distance threshold, and a third distance threshold. When a user holding a smartphone in hand enters a parking lot from an elevator and walks to an intelligent vehicle of the user, and a distance is less than the second distance threshold, the smartphone and the intelligent vehicle start to perform Bluetooth pairing. When the distance is less than the first distance threshold, and the user keeps approaching the intelligent vehicle, a vehicle door lock near a user side is controlled to be unlocked, so that a function of performing unlocking without perception of the user is implemented. When the user gets off the vehicle, closes a vehicle door, and walks away from the vehicle until the third distance threshold is reached, it is determined that the vehicle door currently needs to be closed, to control an unlocked vehicle door lock to be locked, so that a function of locking the vehicle door lock without perception of the user is implemented.

It may be understood that any one of the foregoing embodiments of the smart lock unlocking method in this application may be applied to a digital key system in various scenarios, for example, unlocking fields such as vehicle sharing, time-based renting, a vehicle rental service, delivery to a trunk, a home door lock, a company door status control device, and a safe. Details are not described herein.

Figure 7:
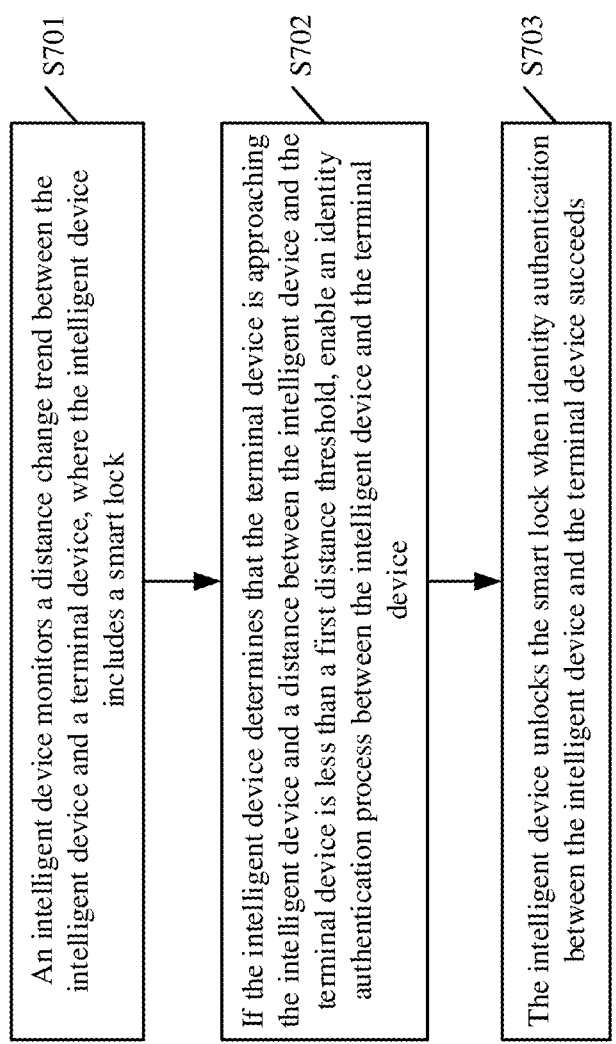
FIG. 7 is a schematic flowchart of still another smart lock unlocking method according to an embodiment of the present invention.

FIG. 7 is a schematic flowchart of still another smart lock unlocking method according to an embodiment of the present invention. The method may be applied to the foregoing system architecture in FIG. 2 or FIG. 3. An intelligent device in the method may be the intelligent device 20 in the system architecture in FIG. 2 or FIG. 3, and may be configured to support and perform a method procedure shown in FIG. 7. The following describes the method from a perspective of the intelligent device with reference to FIG. 7. The method may include the following steps S701 to step S703.

Step S701: The intelligent device monitors a distance change trend between the intelligent device and a terminal device, where the intelligent device includes a smart lock.

Step S702: If the intelligent device determines that the terminal device is approaching the intelligent device and a distance between the intelligent device and the terminal device is less than a first distance threshold, enable an identity authentication process between the intelligent device and the terminal device.

Step S703: The intelligent device unlocks the smart lock when identity authentication between the intelligent device and the terminal device succeeds.

Specifically, for step S701 to step S703, refer to step S502 to step S504 in the foregoing embodiment in FIG. 4. Details are not described herein again. It should be noted that a specific implementation in which the intelligent device performs monitoring, performs determining, enables identity authentication, or unlocks the smart lock may be different depending on a difference of structures, sensors, and related function modules of the intelligent device and the terminal device. For example, an intelligent vehicle may detect, by using an ultrasonic radar, whether a vehicle owner is walking, and control unlocking/locking of the smart lock by using a CAN bus. In other words, some implementation details on the intelligent device side need to vary with a structure and a function of the intelligent device. Details are not described herein.

In a possible implementation, the method further includes: When the distance between the intelligent device and the terminal device is less than a second distance threshold, the intelligent device establishes a communication connection to the terminal device through Bluetooth, and triggers the distance change trend between the intelligent device and the terminal device to be monitored, where the second distance threshold is greater than the first distance threshold.

In a possible implementation, the method further includes: The intelligent device locks the smart lock if the intelligent device determines that the intelligent device is being away from the terminal device and the distance between the intelligent device and the terminal device is greater than the second distance threshold.

In a possible implementation, that the intelligent device monitors a distance change trend between the intelligent device and a terminal device includes:

The intelligent device determines a distance change between the intelligent device and the terminal device based on first distance information between the intelligent device and the terminal device, where the first distance information includes one or more of Bluetooth signal strength change information, global positioning system (GPS) ranging information, or impulse radio ultra-wideband (IR-UWB) ranging information.

In a possible implementation, before the enabling of an identity authentication process between the intelligent device and the terminal device, the method further includes: The intelligent device compares an environment parameter of the intelligent device and a corresponding environment parameter of the terminal device, where the environment parameter includes one or more of temperature, humidity, light intensity, smell, or noise. The intelligent device determines, based on a comparison result, whether the terminal device and the intelligent device are located in a same environment. If yes, the intelligent device allows the identity authentication process between the intelligent device and the terminal device to be enabled.

In a possible implementation, before the enabling of an identity authentication process between the intelligent device and the terminal device, the method further includes: The intelligent device receives a sound response indication initiated by the terminal device. The intelligent device sends a feedback sound to the terminal device based on the sound response indication. If it is determined that a sound response is successfully matched, the intelligent device allows the identity authentication process between the intelligent device and the terminal device to be enabled.

In a possible implementation, the identity authentication process between the intelligent device and the terminal device includes: The intelligent device and the terminal device perform a security authentication process based on a pre-authenticated shared key or a public-private key pair.

In a possible implementation, the intelligent device includes a plurality of smart locks; and the unlocking of the smart lock includes: The intelligent device determines a target smart lock in the plurality of smart locks that is closest to the terminal device, and unlocks the target smart lock.

This application further provides still another smart lock unlocking method. The method may include: A terminal device monitors a distance change trend between the terminal device and an intelligent device, where the intelligent device includes a smart lock. If the terminal device determines that the terminal device is approaching the intelligent device and a distance between the terminal device and the intelligent device is less than a first distance threshold, the terminal device enables an identity authentication process between the terminal device and the intelligent device. The intelligent device unlocks the smart lock when identity authentication between the terminal device and the intelligent device succeeds. In this embodiment, the terminal device monitors the distance change trend between the terminal device and the intelligent device in which the smart lock is located, and enables the identity authentication process between the terminal device and the intelligent device only when the terminal device determines that the terminal device is approaching the intelligent device and the distance is less than a specific threshold, and the intelligent device unlocks the smart lock after identity authentication succeeds. Before enabling the identity authentication process, the terminal device not only considers the distance between the terminal device and the intelligent device, but also monitors the distance change trend between the terminal device and the intelligent device to determine whether the terminal device is approaching the intelligent device, in other words, fully determines whether a user holding the terminal device has an unlocking intention, to avoid enabling the identity authentication process only by determining the distance (within a communication range of a near field communication manner), so that a potential risk that an attacker can perform unlocking without authorization only by using a relay attack to forge an illusion of a short distance is avoided, thereby greatly improving unlocking security of a digital key.

Based on the foregoing descriptions, the distance change trend between the terminal device and the intelligent device may be monitored by the terminal device, may be monitored by the intelligent device, or may be jointly monitored by the terminal device and the intelligent device. Optionally, whether the terminal device is approaching or being away from the intelligent device and the distance between the terminal device and the intelligent device may be determined by the terminal device, may be determined by the intelligent device, or may be jointly determined by the terminal device and the intelligent device. Further optionally, the identity authentication process between the terminal device and the intelligent device may be enabled by the terminal device, or may be enabled by the intelligent device. Still further optionally, unlocking/locking of the smart lock may be finally controlled by the terminal device or the intelligent device. In other words, in this application, specific execution bodies of all or some steps in a process in which the distance change trend between the terminal device and the intelligent device is monitored, the distance and the distance threshold are compared, the identity authentication process is enabled, and the smart lock is unlocked/locked are not specifically limited, and all or some steps may be performed by the terminal device or the intelligent device alone, or may be partially performed by the terminal device and partially performed by the intelligent device through interaction, provided that a corresponding result can be finally determined or obtained.

The foregoing describes in detail the method in the embodiments of the present invention, and the following provides a related apparatus in the embodiments of the present invention.

Figure 8:
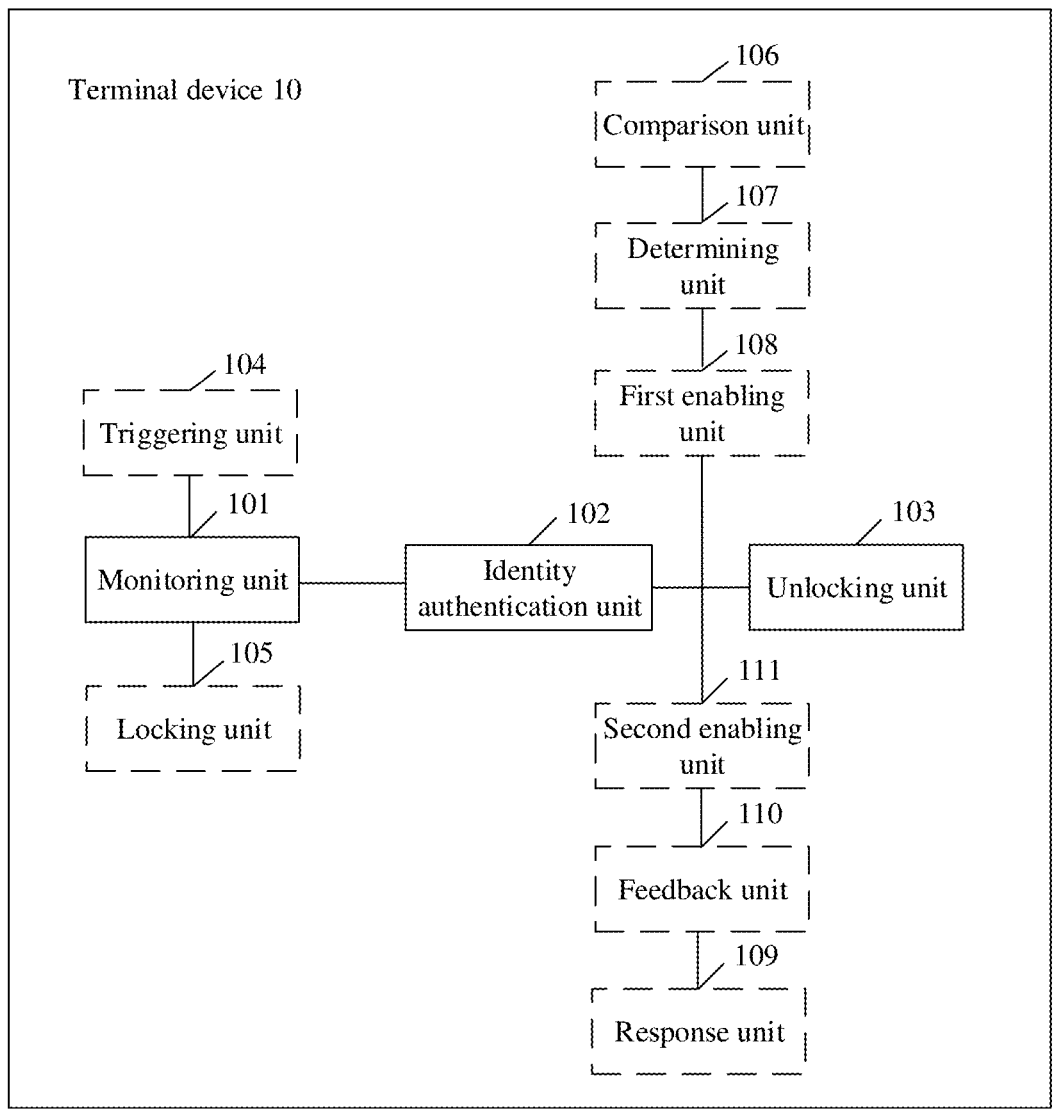
FIG. 8 is a schematic diagram of a structure of a terminal device according to an embodiment of the present invention.

FIG. 8 is a schematic diagram of a structure of a terminal device according to an embodiment of the present invention. The terminal device 10 may include a monitoring unit 101, an identity authentication unit 102, and an unlocking unit 103. Detailed descriptions of the units are as follows:

The monitoring unit 101 is configured to monitor a distance change trend between the terminal device and an intelligent device, where the intelligent device includes a smart lock.

The identity authentication unit 102 is configured to: if it is determined that the terminal device is approaching the intelligent device and a distance between the terminal device and the intelligent device is less than a first distance threshold, enable an identity authentication process between the terminal device and the intelligent device.

The unlocking unit 103 is configured to unlock the smart lock when identity authentication between the terminal device and the intelligent device succeeds.

In a possible implementation, the terminal device further includes:

a triggering unit 104, configured to: when the distance between the terminal device and the intelligent device is less than a second distance threshold, establish a communication connection to the intelligent device through Bluetooth, and trigger the monitoring unit to monitor the distance change trend between the terminal device and the intelligent device, where the second distance threshold is greater than the first distance threshold.

In a possible implementation, the terminal device further includes:

a locking unit 105, configured to lock the smart lock if it is determined that the terminal device is being away from the intelligent device and the distance between the terminal device and the intelligent device is greater than a third distance threshold.

In a possible implementation, the monitoring unit is further configured to determine a distance change between the terminal device and the intelligent device based on first distance information between the terminal device and the intelligent device, where the first distance information includes one or more of Bluetooth signal strength change information, global positioning system (GPS) ranging information, or impulse radio ultra-wideband (IR-UWB) ranging information.

In a possible implementation, the terminal device further includes:

a comparison unit 106, configured to compare an environment parameter of the terminal device and a corresponding environment parameter of the intelligent device, where the environment parameter includes one or more of temperature, humidity, light intensity, smell, or noise;

a determining unit 107, configured to determine, based on a comparison result, whether the terminal device and the intelligent device are located in a same environment; and a first enabling unit 108, configured to: if it is determined that the terminal device and the intelligent device are located in a same environment, allow the identity authentication process between the terminal device and the intelligent device to be enabled.

In a possible implementation, the terminal device further includes:

a response unit 109, configured to initiate a sound response indication to the intelligent device;

a feedback unit 110, configured to receive a feedback sound sent by the intelligent device based on the sound response indication; and a second enabling unit 111, configured to: if it is determined that a sound response is successfully matched, allow the identity authentication process between the terminal device and the intelligent device to be enabled.

In a possible implementation, the identity authentication process between the terminal device and the intelligent device includes: The terminal device and the intelligent device perform a security authentication process based on a pre-authenticated shared key or a public-private key pair.

In a possible implementation, the intelligent device includes a plurality of smart locks; and the unlocking unit is further configured to: determine a target smart lock in the plurality of smart locks that is closest to the terminal device, and unlock the target smart lock.

It should be noted that for functions of the functional units in the terminal device 10 described in this embodiment, refer to related descriptions of step S401 to step S403 in the method embodiment described in FIG. 2, or refer to related descriptions of step S501 to step S506 in the method embodiment described in FIG. 5. Details are not described herein again.

Figure 9:
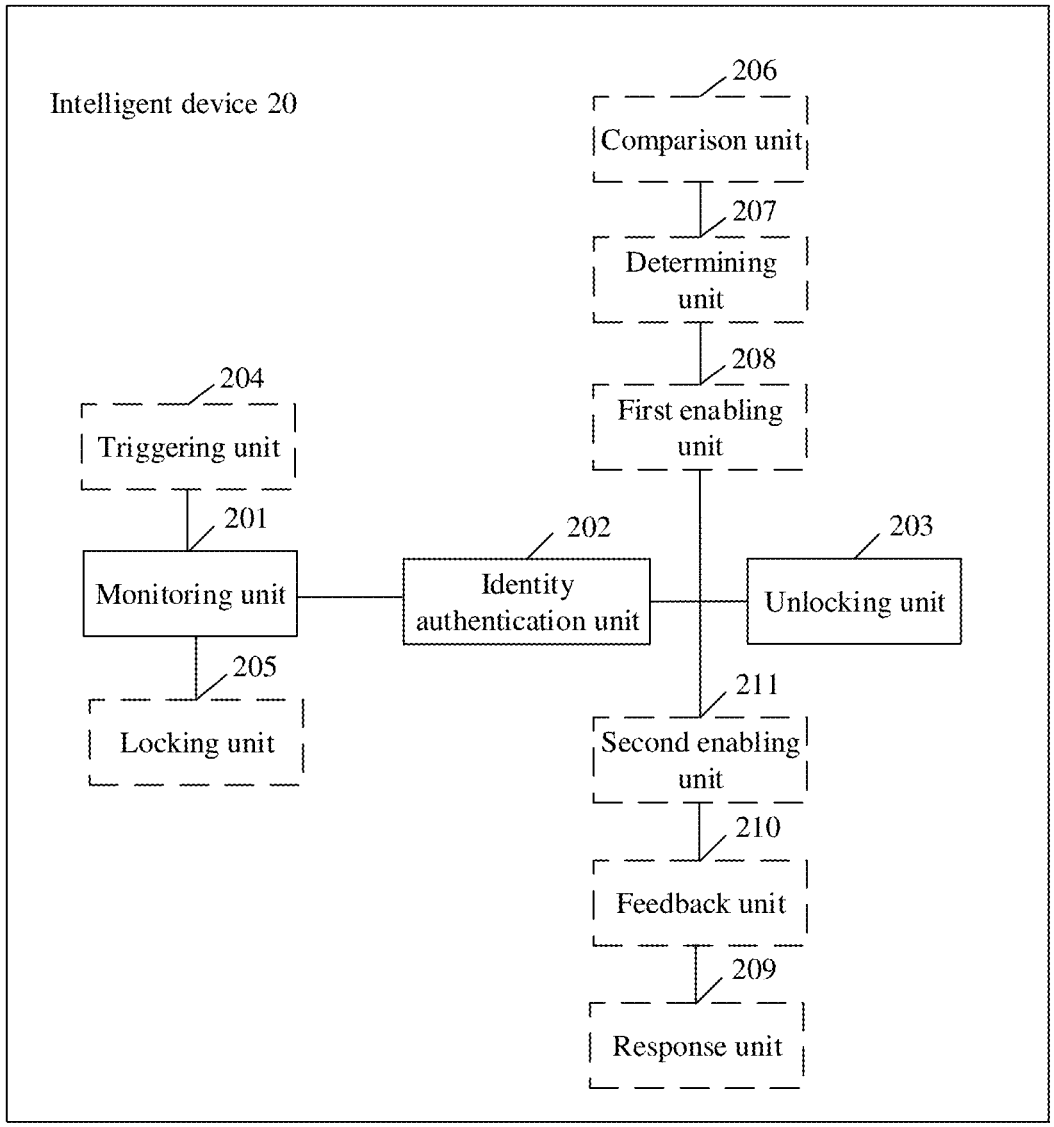
FIG. 9 is a schematic diagram of a structure of an intelligent device according to an embodiment of the present invention.

FIG. 9 is a schematic diagram of a structure of an intelligent device according to an embodiment of the present invention. The intelligent device 20 may include a monitoring unit 201, an identity authentication unit 202, and an unlocking unit 203. Detailed descriptions of the units are as follows:

The monitoring unit 201 is configured to monitor a distance change trend between the intelligent device and a terminal device, where the intelligent device includes a smart lock.

The identity authentication unit 202 is configured to: if it is determined that the terminal device is approaching the intelligent device and a distance between the intelligent device and the terminal device is less than a first distance threshold, enable an identity authentication process between the intelligent device and the terminal device.

The unlocking unit 203 is configured to unlock the smart lock when identity authentication between the intelligent device and the terminal device succeeds.

In a possible implementation, the intelligent device further includes:
- a triggering unit 204, configured to: when the distance between the intelligent device and the terminal device is less than a second distance threshold, establish a communication connection to the terminal device through Bluetooth, and trigger the monitoring unit to monitor the distance change trend between the intelligent device and the terminal device, where the second distance threshold is greater than the first distance threshold.

In a possible implementation, the intelligent device further includes:
- a locking unit 205, configured to lock the smart lock if it is determined that the intelligent device is being away from the terminal device and the distance between the intelligent device and the terminal device is greater than the second distance threshold.

In a possible implementation, the monitoring unit is further configured to determine a distance change between the intelligent device and the terminal device based on first distance information between the intelligent device and the terminal device, where the first distance information includes one or more of Bluetooth signal strength change information, global positioning system (GPS) ranging information, or impulse radio ultra-wideband (IR-UWB) ranging information.

In a possible implementation, the intelligent device further includes:
- a comparison unit 206, configured to compare an environment parameter of the intelligent device and a corresponding environment parameter of the terminal device, where the environment parameter includes one or more of temperature, humidity, light intensity, smell, or noise;
- a determining unit 207, configured to determine, based on a comparison result, whether the intelligent device and the terminal device are located in a same environment; and
- a first enabling unit 208, configured to: if it is determined that the intelligent device and the terminal device are located in a same environment, allow the identity authentication process between the intelligent device and the terminal device to be enabled.

In a possible implementation, the intelligent device further includes:
- a response unit 209, configured to receive a sound response indication initiated by the terminal device;
- a feedback unit 210, configured to send a feedback sound to the terminal device based on the sound response indication; and
- a second enabling unit 211, configured to: if it is determined that a sound response is successfully matched, allow the identity authentication process between the intelligent device and the terminal device to be enabled.

In a possible implementation, the identity authentication process between the intelligent device and the terminal device includes: The intelligent device and the terminal device perform a security authentication process based on a pre-authenticated shared key or a public-private key pair.

In a possible implementation, the intelligent device includes a plurality of smart locks; and the unlocking unit is further configured to: determine a target smart lock in the plurality of smart locks that is closest to the terminal device, and unlock the target smart lock.

It should be noted that, for functions of functional units in the intelligent device 20 described in this embodiment, refer to related descriptions of step S701 to step S703 in the method embodiment in FIG. 7. Details are not described herein again.

Figure 10:
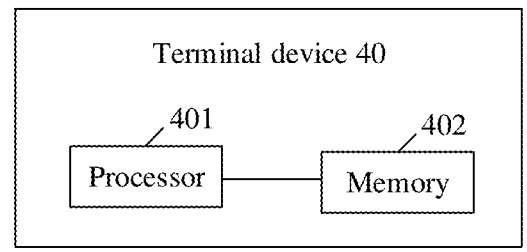
FIG. 10 is a schematic diagram of a structure of another terminal device according to an embodiment of the present invention.

FIG. 10 is a schematic diagram of a structure of another terminal device according to an embodiment of the present invention. The terminal device 40 may include a processor 401 and a memory 402. Detailed descriptions of the units are as follows:

The memory 402 is configured to store program code, and the processor 401 is configured to invoke the program code stored in the memory, to perform the following steps: monitoring a distance change trend between the terminal device and an intelligent device, where the intelligent device includes a smart lock; if it is determined that the terminal device is approaching the intelligent device and a distance between the terminal device and the intelligent device is less than a first distance threshold, enabling an identity authentication process between the terminal device and the intelligent device; and unlocking the smart lock when identity authentication between the terminal device and the intelligent device succeeds.

In a possible implementation, the processor 401 is further configured to: when the distance between the terminal device and the intelligent device is less than a second distance threshold, establish a communication connection to the intelligent device through Bluetooth, and trigger the distance change trend between the terminal device and the intelligent device to be monitored, where the second distance threshold is greater than the first distance threshold.

In a possible implementation, the processor 401 is further configured to lock the smart lock if it is determined that the terminal device is being away from the intelligent device and the distance between the terminal device and the intelligent device is greater than a third distance threshold.

In a possible implementation, the processor 401 is further configured to determine a distance change between the terminal device and the intelligent device based on first distance information between the terminal device and the intelligent device, where the first distance information includes one or more of Bluetooth signal strength change information, global positioning system (GPS) ranging information, or impulse radio ultra-wideband (IR-UWB) ranging information.

In a possible implementation, the processor 401 is further configured to: compare an environment parameter of the terminal device and a corresponding environment parameter of the intelligent device, where the environment parameter includes one or more of temperature, humidity, light intensity, smell, or noise; determine, based on a comparison result, whether the terminal device and the intelligent device are located in a same environment; and if it is determined that the terminal device and the intelligent device are located in a same environment, allow the identity authentication process between the terminal device and the intelligent device to be enabled.

In a possible implementation, the processor 401 is further configured to: initiate a sound response indication to the intelligent device; and
    receive a feedback sound sent by the intelligent device based on the sound response indication; and if it is determined that a sound response is successfully matched, allow the identity authentication process between the terminal device and the intelligent device to be enabled.

In a possible implementation, the identity authentication process between the terminal device and the intelligent device includes: The terminal device and the intelligent device perform a security authentication process based on a pre-authenticated shared key or a public-private key pair.

In a possible implementation, the intelligent device includes a plurality of smart locks; and the processor 401 is further configured to: determine a target smart lock in the plurality of smart locks that is closest to the terminal device, and unlock the target smart lock.

It should be noted that for functions of the functional units in the terminal device 40 described in this embodiment, refer to related descriptions of step S401 to step S403 in the method embodiment described in FIG. 2, or refer to related descriptions of step S501 to step S506 in the method embodiment described in FIG. 5. Details are not described herein again.

Figure 11:
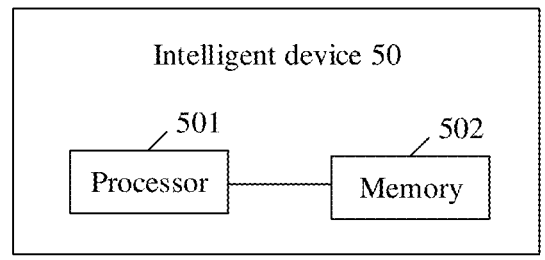
FIG. 11 is a schematic diagram of a structure of another intelligent device according to an embodiment of the present invention.

FIG. 11 is a schematic diagram of a structure of another intelligent device according to an embodiment of the present invention. The intelligent device 50 may include a processor 501 and a memory 502. Detailed descriptions of the units are as follows:

The memory 502 is configured to store program code, and the processor 501 is configured to invoke the program code stored in the memory, to perform the following steps:
    monitoring a distance change trend between the intelligent device and a terminal device, where the intelligent device includes a smart lock; if it is determined that the terminal device is approaching the intelligent device and a distance between the intelligent device and the terminal device is less than a first distance threshold, enabling an identity authentication process between the intelligent device and the terminal device; and unlocking the smart lock when identity authentication between the intelligent device and the terminal device succeeds; and
    when the distance between the intelligent device and the terminal device is less than a second distance threshold, establishing a communication connection to the terminal device through Bluetooth, and triggering the distance change trend between the intelligent device and the terminal device to be monitored, where the second distance threshold is greater than the first distance threshold.

In a possible implementation, the processor 501 is further configured to lock the smart lock if it is determined that the intelligent device is being away from the terminal device and the distance between the intelligent device and the terminal device is greater than the second distance threshold.

In a possible implementation, the processor 501 is further configured to determine a distance change between the intelligent device and the terminal device based on first distance information between the intelligent device and the terminal device, where the first distance information includes one or more of Bluetooth signal strength change information, global positioning system (GPS) ranging information, or impulse radio ultra-wideband (IR-UWB) ranging information.

In a possible implementation, the processor 501 is further configured to: compare an environment parameter of the intelligent device and a corresponding environment parameter of the terminal device, where the environment parameter includes one or more of temperature, humidity, light intensity, smell, or noise; determine, based on a comparison result, whether the intelligent device and the terminal device are located in a same environment; and if it is determined that the intelligent device and the terminal device are located in a same environment, allow the identity authentication process between the intelligent device and the terminal device to be enabled.

In a possible implementation, the processor 501 is further configured to: receive a sound response indication initiated by the terminal device; send a feedback sound to the terminal device based on the sound response indication; and if it is determined that a sound response is successfully matched, allow the identity authentication process between the intelligent device and the terminal device to be enabled.

In a possible implementation, the identity authentication process between the intelligent device and the terminal device includes: The intelligent device and the terminal device perform a security authentication process based on a pre-authenticated shared key or a public-private key pair.

In a possible implementation, the intelligent device includes a plurality of smart locks; and the processor 501 is further configured to: determine a target smart lock in the plurality of smart locks that is closest to the terminal device, and unlock the target smart lock.

It should be noted that, for functions of functional units in the intelligent device 50 described in this embodiment, refer to related descriptions of step S701 to step S703 in the method embodiment in FIG. 7. Details are not described herein again.

Figure 12:
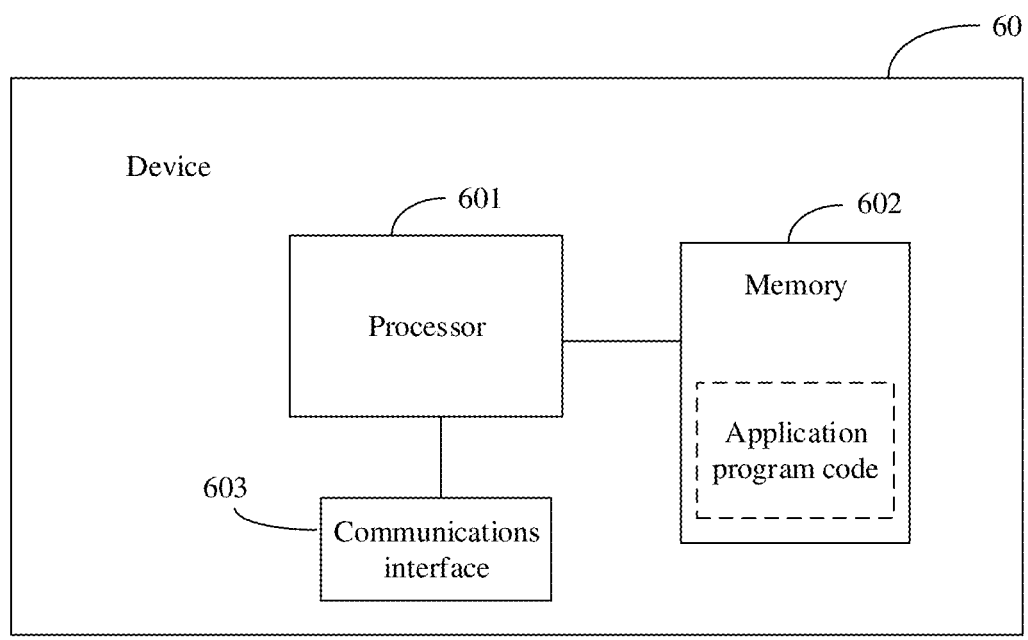
FIG. 12 is a schematic diagram of a structure of a device according to an embodiment of the present invention.

FIG. 12 is a schematic diagram of a structure of a device according to an embodiment of the present invention. The terminal device 10 and the intelligent device 20 may be implemented by using structures in FIG. 12. The device 60 includes at least one processor 601, at least one memory 602, and at least one communications interface 603. In addition, the device may further include a general-purpose component such as an antenna, and details are not described herein.

The processor 601 may be a general-purpose central processing unit (CPU), a microprocessor, an application-specific integrated circuit (ASIC), or one or more integrated circuits for controlling program execution of the foregoing solution.

The communications interface 603 is used for communication with another device or a communications network, for example, an update server, a key server, or a vehicle-mounted device.

The memory 602 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a Blu-ray optical disc, or the like), or magnetic disk storage media or other magnetic storage devices, or any other media that can be accessed by a computer and that can be configured to carry or store expected program code in an instruction form or in a data structure form, without being limited thereto. The memory may exist independently, and is connected to the processor through a bus. Alternatively, the memory may be integrated with the processor.

The memory 602 is configured to store application program code for executing the foregoing solution, and the processor 601 controls the execution. The processor 601 is configured to execute the application program code stored in the memory 602, to implement related functions of the terminal device 10 and the intelligent device 20.

It should be noted that for functions of the terminal device 10 and the intelligent device 20 described in this embodiment, refer to related descriptions in the foregoing method embodiments in FIG. 2 to FIG. 7. Details are not described herein again.

An embodiment of the present invention further provides a computer storage medium, and the computer storage medium may store a program. When the program is executed, some or all of the steps of any smart lock unlocking method described in the foregoing method embodiments are included.

An embodiment of the present invention further provides a computer program, and the computer program includes instructions. When a computer executes the computer program, the computer may be enabled to perform some or all of the steps of any smart lock unlocking method.

In the foregoing embodiments, the descriptions of each embodiment have respective focuses. For a part that is not described in detail in an embodiment, refer to related descriptions in other embodiments.

It should be noted that, for brief descriptions, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to preferred embodiments, and the involved actions and modules are not necessarily required in this application.

In the several embodiments provided in this application, it should be understood that the disclosed apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like, and may be specifically a processor in the computer device) to perform all or some of the steps of the methods described in the embodiments of this application. The storage medium may include any medium that can store program code, such as a USB flash drive, a removable hard disk, a magnetic disk, an optical disc, a read-only memory (ROM for short), or a random access memory (RAM for short).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for controlling a smart lock, comprising:
   monitoring, by a terminal device, a distance change trend between the terminal device and an intelligent device, wherein the intelligent device comprises the smart lock;
   upon determining that the terminal device is approaching the intelligent device and a distance between the terminal device and the intelligent device is less than a first distance threshold, enabling, by the terminal device, an identity authentication process between the terminal device and the intelligent device; and
   unlocking, by the terminal device, the smart lock based upon determination that identity authentication between the terminal device and the intelligent device succeeds,
   wherein the method further comprises;
   upon determining that the distance between the terminal device and the intelligent device is less than a second distance threshold, establishing, by the terminal deice, a communication connection to the intelligent device through Bluetooth, and triggering the monitoring of the distance change trend between the terminal device and the intelligent device, wherein the second distance threshold is greater than the first distance threshold.

2. The method according to claim 1, further comprising: locking the smart lock upon determining that the distance between the terminal device and the intelligent device is greater than a third distance threshold.

3. The method according to claim 1, wherein the monitoring of the distance change trend between the terminal device and the intelligent device comprises:
determining, by the terminal device, a distance change between the terminal device and the intelligent device based on first distance information between the terminal device and the intelligent device, wherein the first distance information comprises one or more of Bluetooth signal strength change information, global positioning system (GPS) ranging information, or impulse radio ultra-wideband (IR-UWB) ranging information.

4. The method according to claim 1, wherein before the enabling of the identity authentication process between the terminal device and the intelligent device, the method further comprises:
comparing, by the terminal device, an environment parameter of the terminal device and a corresponding environment parameter of the intelligent device to generate a comparison result, wherein the environment parameter comprises one or more of temperature, humidity, light intensity, smell, or noise;
determining, by the terminal device based on the comparison result, whether the terminal device and the intelligent device are located in a same environment; and
upon determining that the terminal device and the intelligent device are located in the same environment, allowing, by the terminal device, the identity authentication process between the terminal device and the intelligent device to be enabled.

5. The method according to claim 1, wherein before the enabling of the identity authentication process between the terminal device and the intelligent device, the method further comprises:
initiating, by the terminal device, a sound response indication to the intelligent device;
receiving, by the terminal device, a feedback sound sent by the intelligent device based on the sound response indication; and
upon determining that the feedback sound and the sound response indication are successfully matched, allowing, by the terminal device, the identity authentication process between the terminal device and the intelligent device to be enabled.

6. The method according to claim 1, wherein the identity authentication process between the terminal device and the intelligent device comprises: performing, by the terminal device and the intelligent device, a security authentication process based on a pre-authenticated shared key or a public-private key pair.

7. The method according to claim 1, wherein the intelligent device comprises a plurality of smart locks; and the unlocking of the smart lock comprises:
determining, by the terminal device, a closest smart lock in the plurality of smart locks based on strength of signals received by the terminal device from the plurality of smart locks, and unlocking the closest smart lock.

8. A terminal device, comprising at least one processor and a memory, wherein
the memory is configured to store program code that, when executed by the at least one processor, cause the terminal device to perform operations comprising:
monitoring a distance change trend between the terminal device and an intelligent device, wherein the intelligent device comprises a smart lock;
upon determining that the terminal device is approaching the intelligent device and a distance between the terminal device and the intelligent device is less than a first distance threshold, enabling an identity authentication process between the terminal device and the intelligent device; and
unlocking the smart lock based upon determination that identity authentication between the terminal device and the intelligent device succeeds,
wherein the operations further comprise:
upon determining that the distance between the terminal device and the intelligent device is less than a second distance, threshold, establishing a communication connection to the intelligent device through Bluetooth, and triggering the monitoring of the distance change trend between the terminal device and the intelligent device, wherein the second distance threshold is greater than the first distance threshold.

9. The terminal device according to claim 8, wherein the operations further comprise:
initiating a sound response indication to the intelligent device;
receiving a feedback sound sent by the intelligent device based on the sound response indication; and
upon determining that the feedback sound and the sound response indication are successfully matched, allowing the identity authentication process between the terminal device and the intelligent device to be enabled.

10. A non-transitory computer readable storage medium, storing a computer program that, when executed by at least one processor, cause the at least one processor to perform operations comprising:
monitoring a distance change trend between a terminal device and an intelligent device, wherein the intelligent device comprises a smart lock;
upon determining that the terminal device is approaching the intelligent device and a distance between the terminal device and the intelligent device is less than a first distance threshold, enabling an identity authentication process between the terminal device and the intelligent device; and
unlocking the smart lock based upon determination that identity authentication between the terminal device and the intelligent device succeeds,
wherein the operations further comprise:
upon determining that the distance between the terminal device and the intelligent device is less than a second distance threshold, establishing a communication connection to the intelligent device through Bluetooth, and triggering the monitoring of the distance change trend between the terminal device and the intelligent device, wherein the second distance threshold is greater than the first distance threshold.

11. The non-transitory computer readable storage medium according to claim 10, wherein the operations further comprise:
locking the smart lock based upon determination that the distance between the terminal device and the intelligent device is greater than a third distance threshold.

12. The non-transitory computer readable storage medium according to claim 10, wherein the monitoring of the distance change trend between the terminal device and the intelligent device comprises:
  determining a distance change between the terminal device and the intelligent device based on first distance information between the terminal device and the intelligent device, wherein the first distance information comprises one or more of Bluetooth signal strength change information, global positioning system (GPS) ranging information, or impulse radio ultra-wideband (IR-UWB) ranging information.

13. The non-transitory computer readable storage medium according to claim 10, when the operations further comprise:
  before the enabling of the identity authentication process between the terminal device and the intelligent device,
  comparing an environment parameter of the terminal device and a corresponding environment parameter of the intelligent device to generate a comparison result, wherein the environment parameter comprises one or more of temperature, humidity, light intensity, smell, or noise;
  determining, based on the comparison result, whether the terminal device and the intelligent device are located in a same environment; and
  upon determining that the terminal device and the intelligent device are located in the same environment, allowing the identity authentication process between the terminal device and the intelligent device to be enabled.

14. The non-transitory computer readable storage medium according to claim 10, wherein the operations further comprise:
  before the enabling of the identity authentication process between the terminal device and the intelligent device:
  initiating a sound response indication to the intelligent device;
  receiving a feedback sound sent by the intelligent device based on the sound response indication; and
  upon determining that the feedback sound and the sound response indication are successfully matched, allowing, by the terminal device, the identity authentication process between the terminal device and the intelligent device to be enabled.

15. The non-transitory computer readable storage medium according to claim 10, wherein the identity authentication process between the terminal device and the intelligent device comprises: performing a security authentication process based on a pre-authenticated shared key or a public-private key pair.

16. The non-transitory computer readable storage medium according to claim 10, wherein the intelligent device comprises a plurality of smart locks; and the unlocking of the smart lock comprises:
  determining a closest smart lock in the plurality of smart locks based on strength of signals received by the terminal device from the plurality of smart locks, and unlocking the closest smart lock.

* * * * *

UNITED STATES PATENT AND TRADEMARK OFFICE
CERTIFICATE OF CORRECTION

PATENT NO. : 12,052,357 B2
APPLICATION NO. : 17/553957
DATED : July 30, 2024
INVENTOR(S) : Yanjiang Yang et al.

It is certified that error appears in the above-identified patent and that said Letters Patent is hereby corrected as shown below:

In the Claims

Column 36, Claim 1, Line 18, change "deice," to --device,--.

Signed and Sealed this
Twenty-seventh Day of August, 2024

Katherine Kelly Vidal
*Director of the United States Patent and Trademark Office*